July 5, 1960 R. BASSINGER 2,943,603
FLUID ACTUATED IMPACT TOOL
Filed Sept. 16, 1954 10 Sheets-Sheet 8
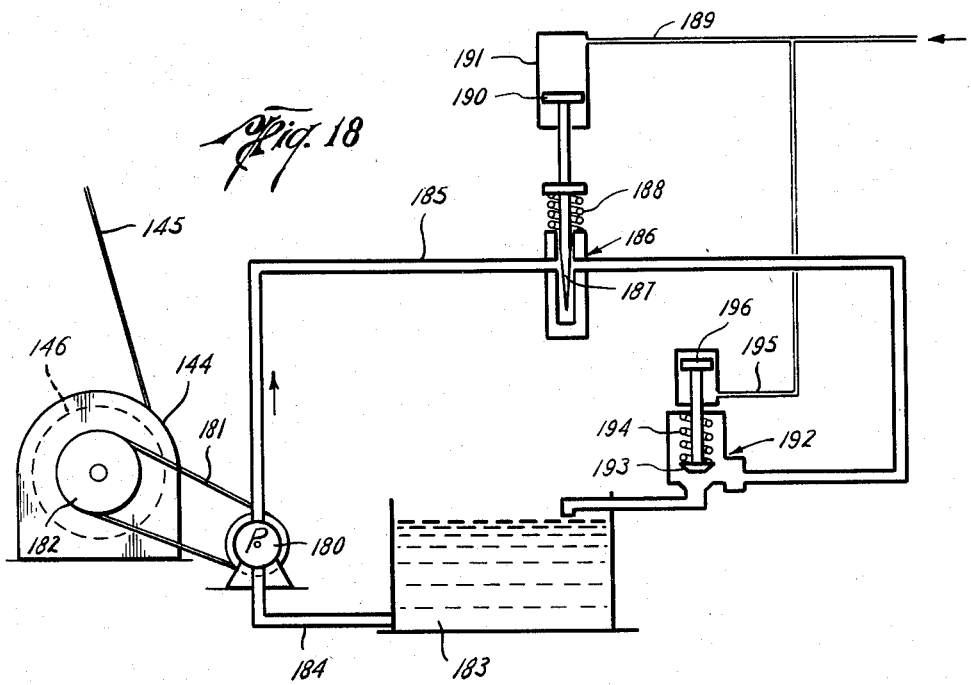
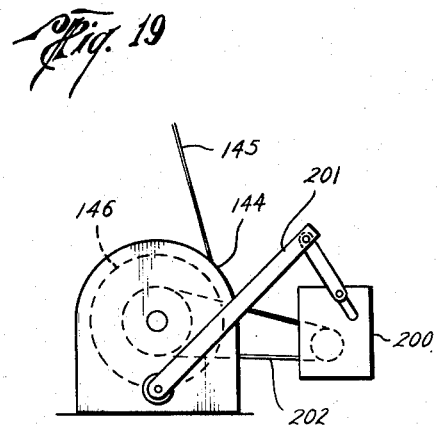
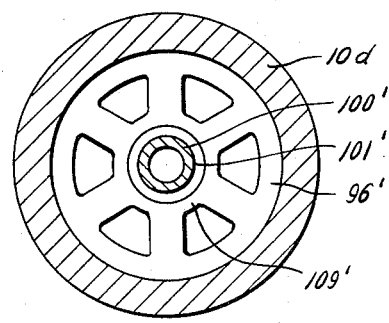
Ross Bassinger
INVENTOR.
ATTORNEYS

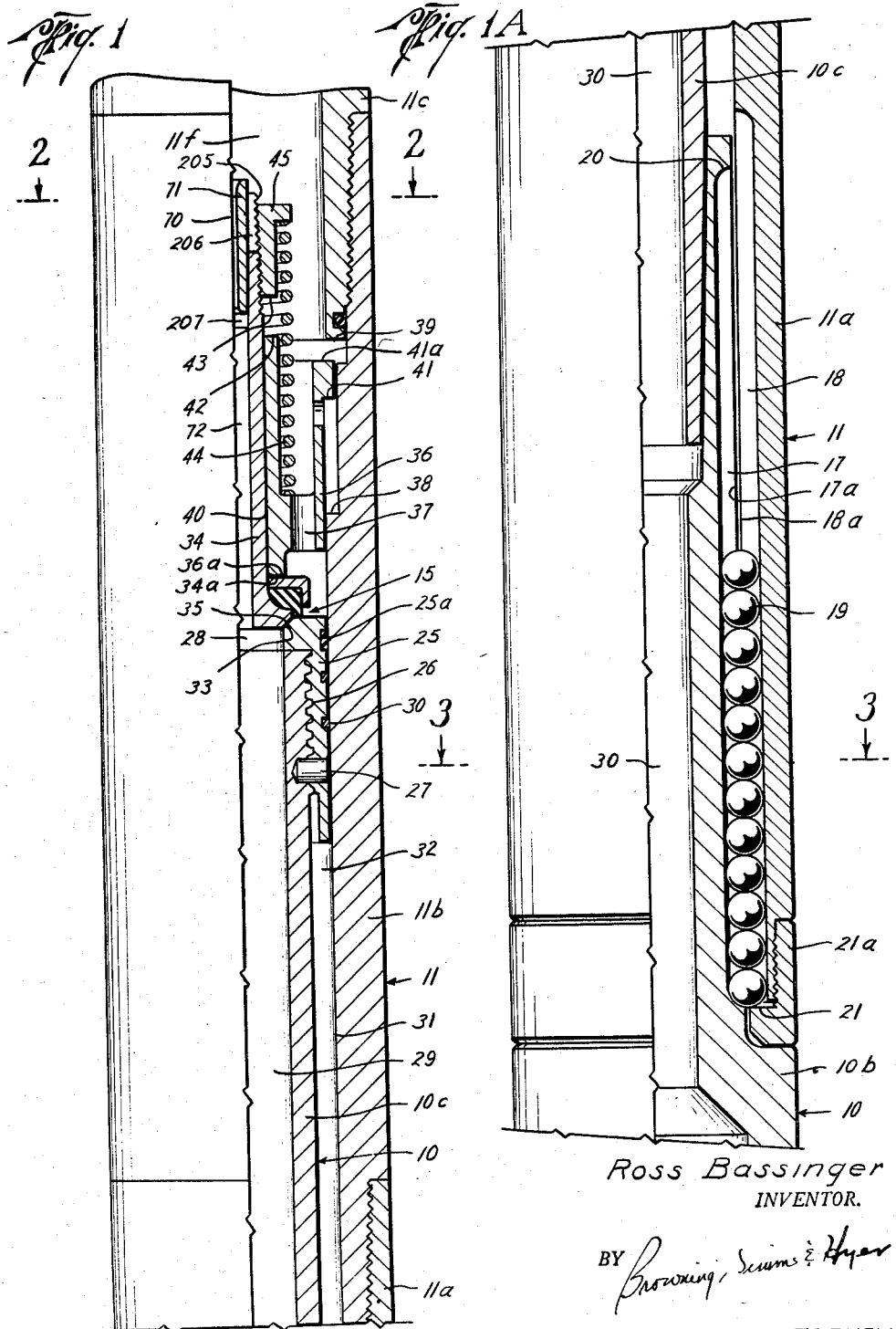

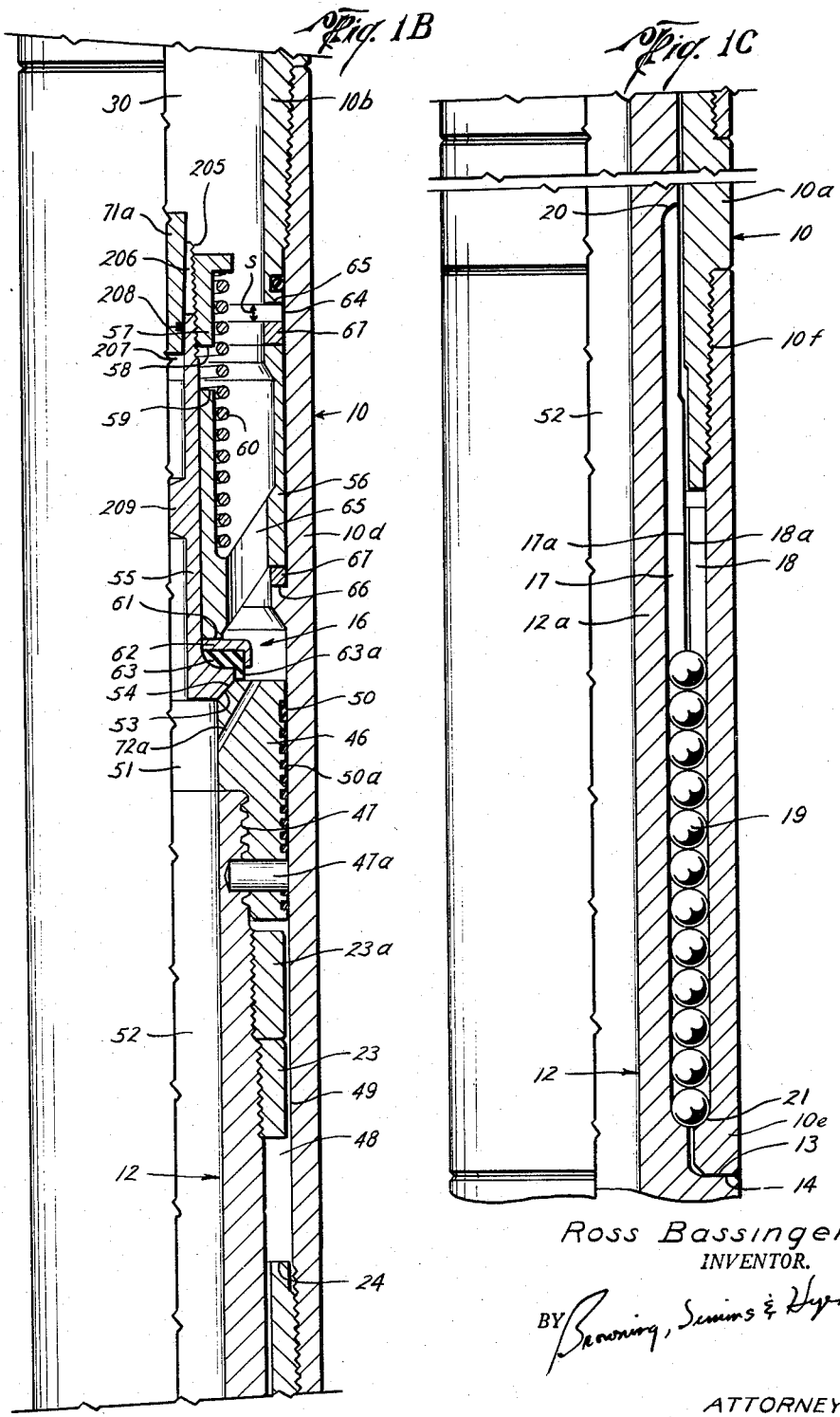

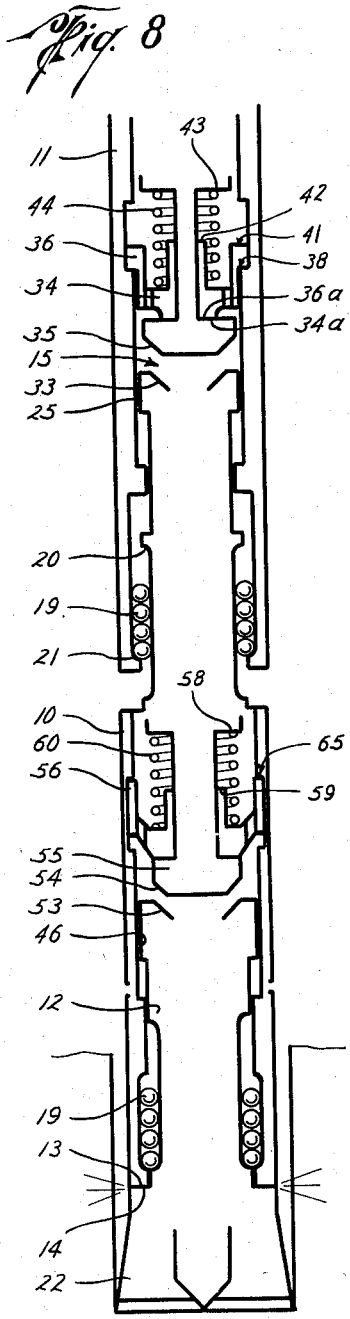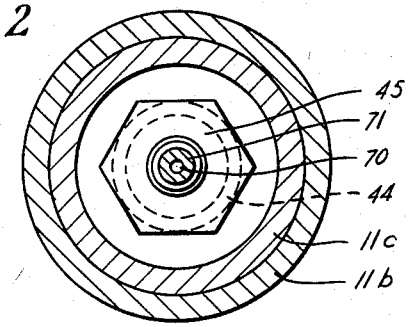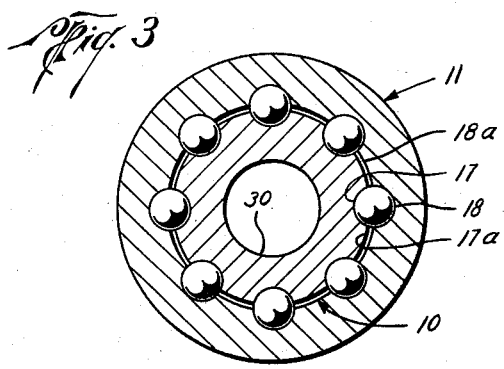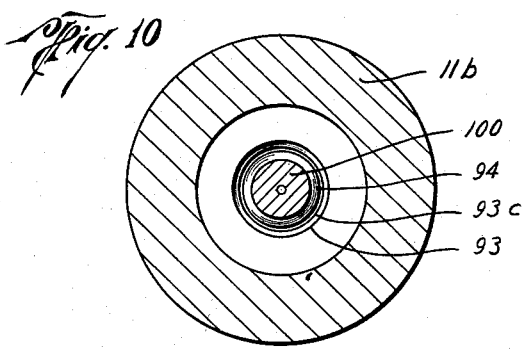
Ross Bassinger
INVENTOR.
ATTORNEYS

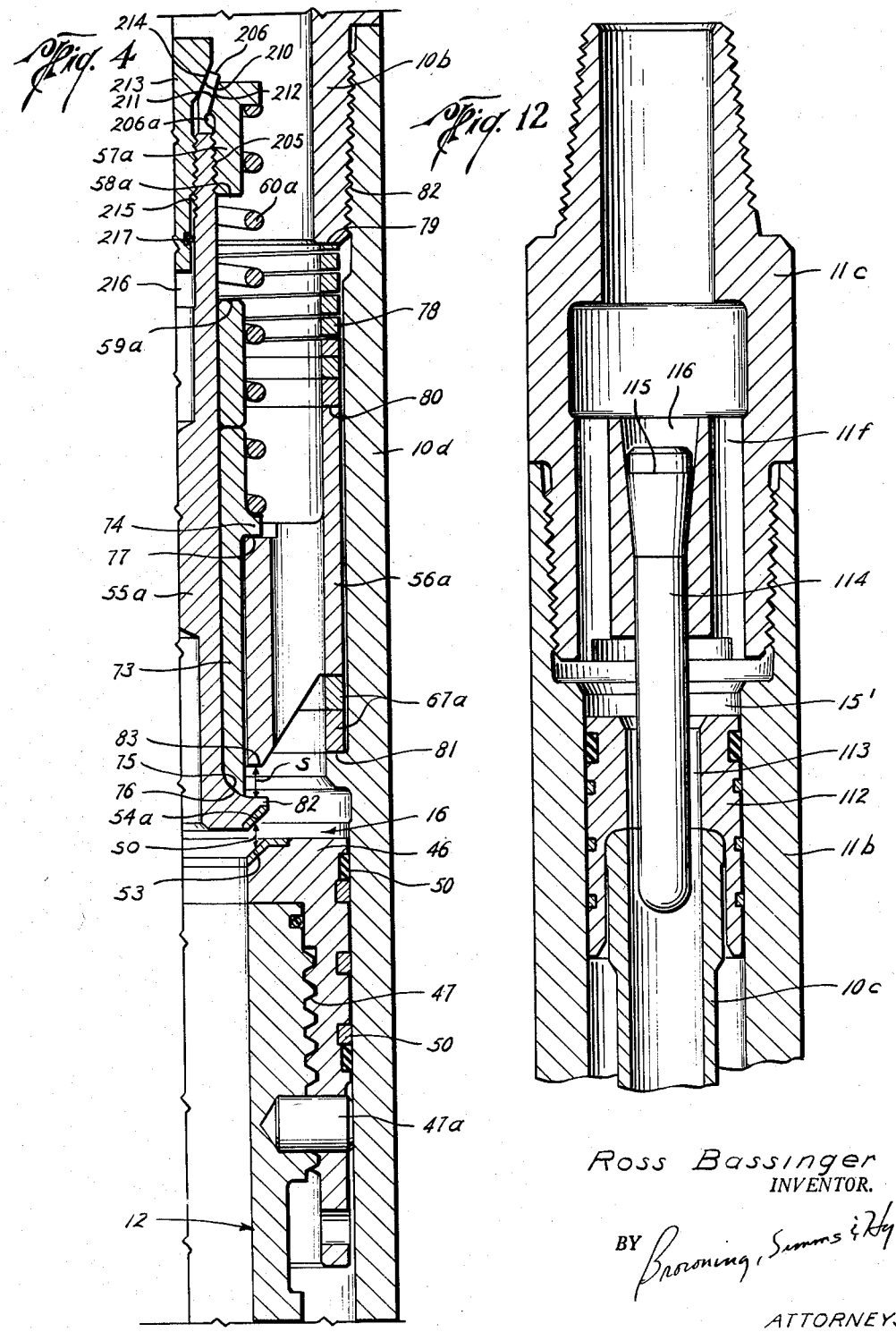

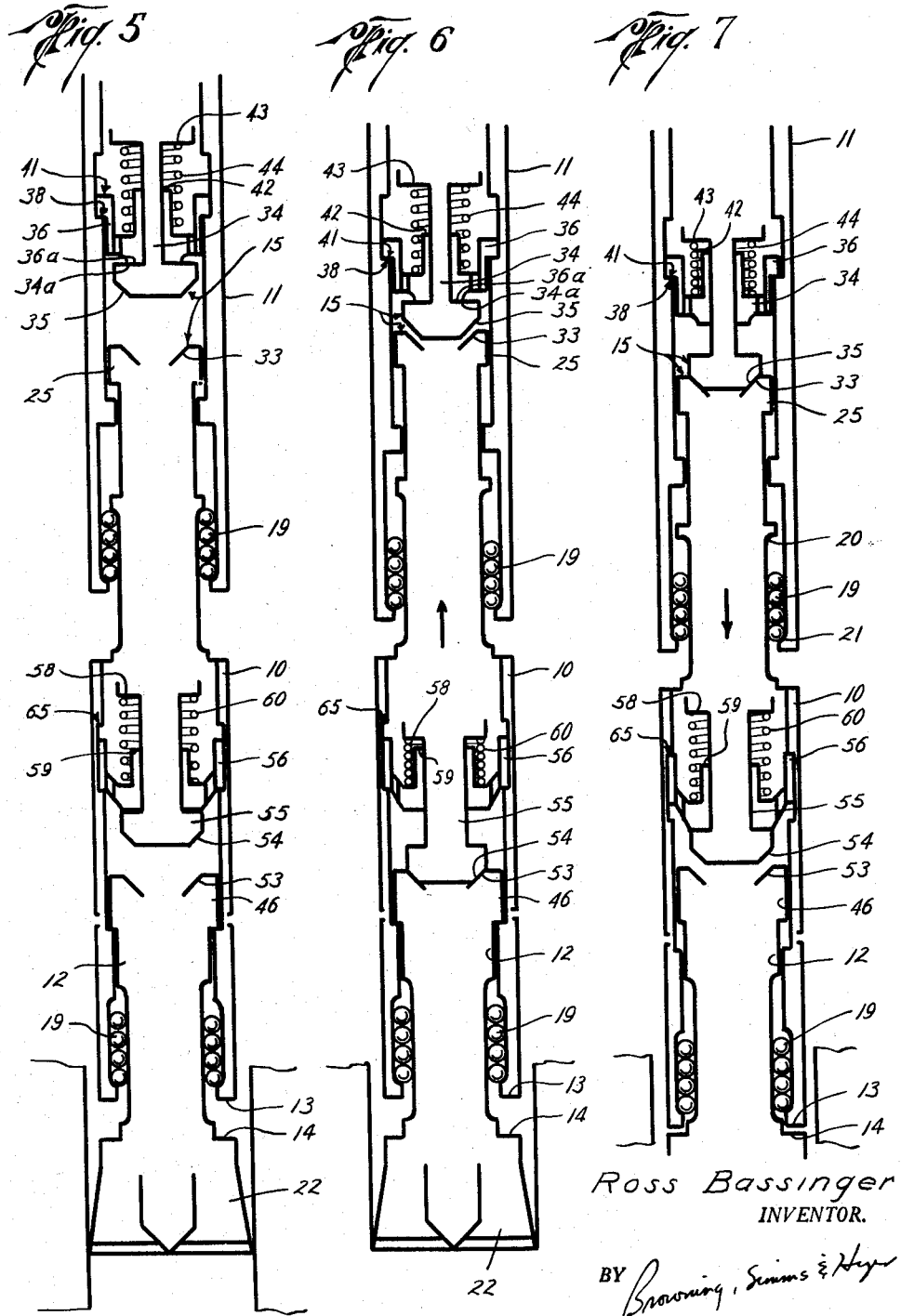

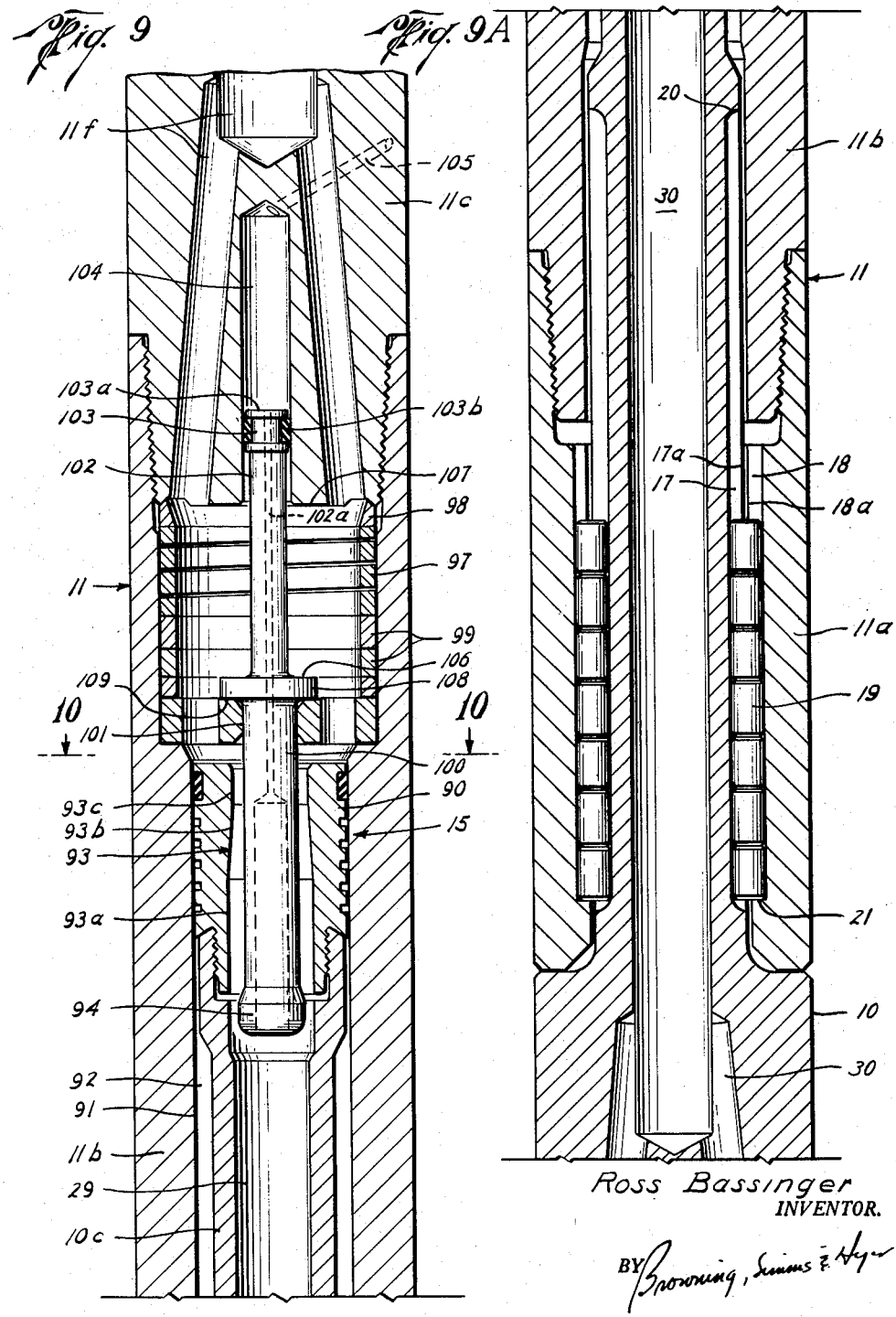

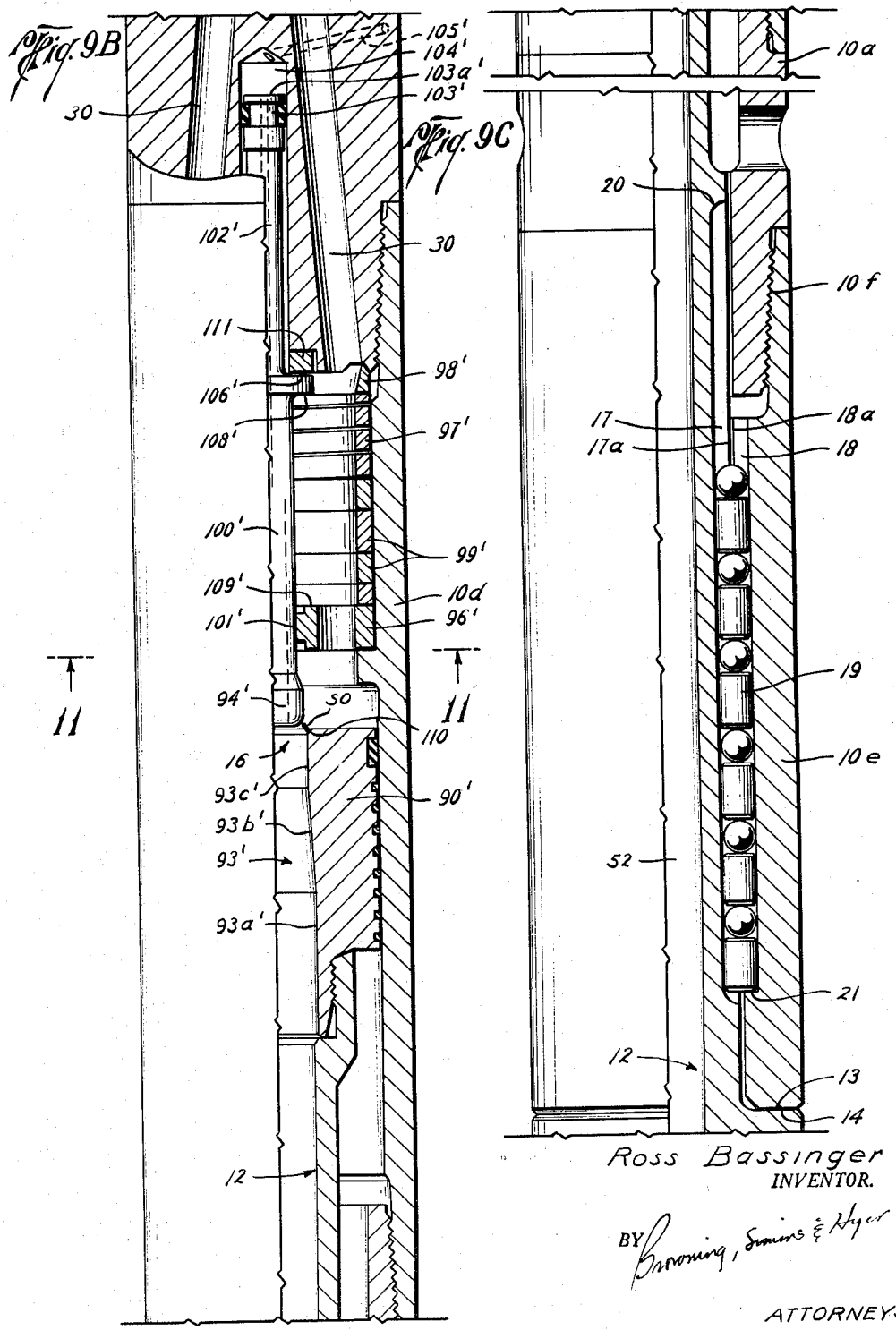

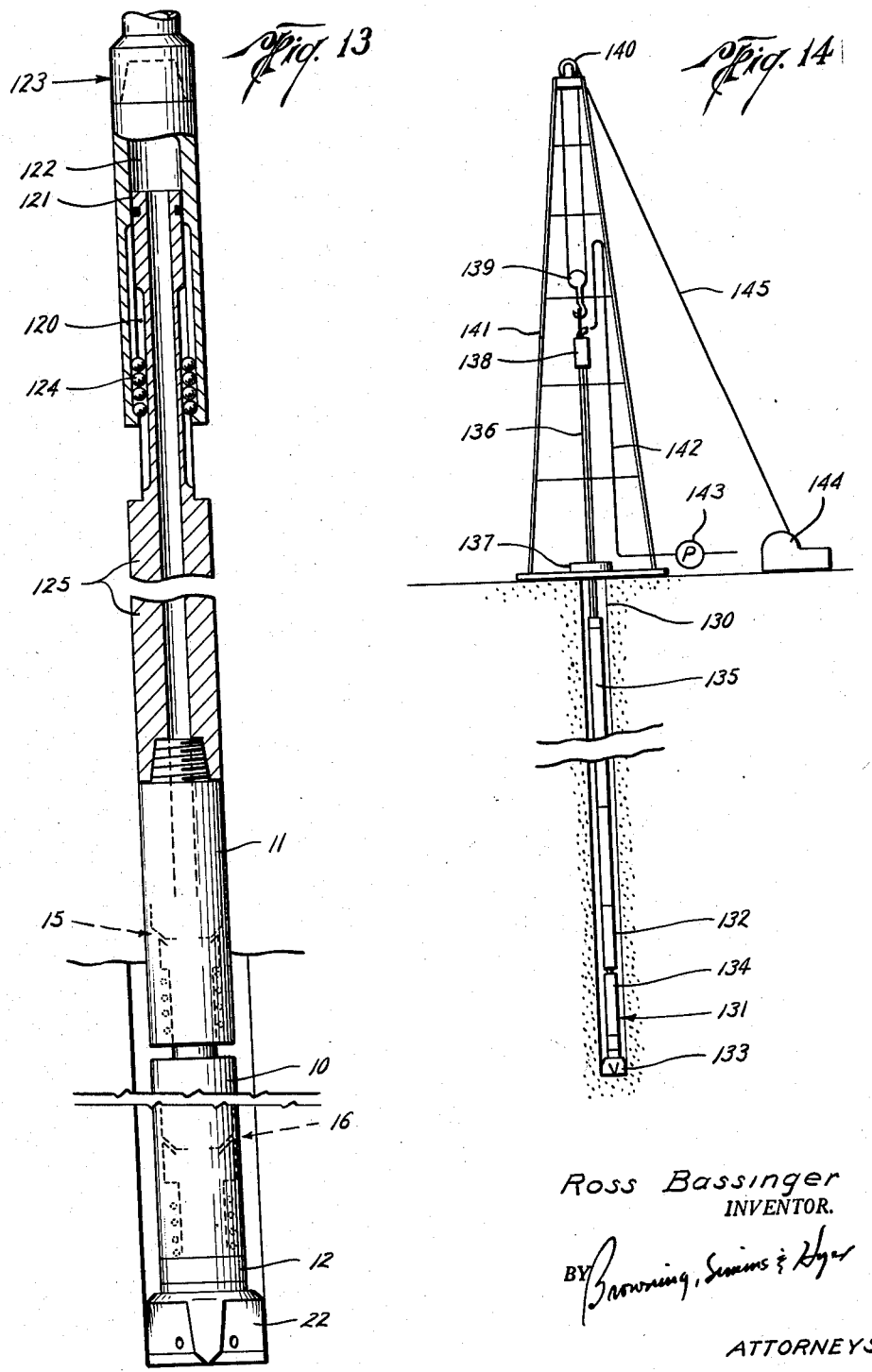

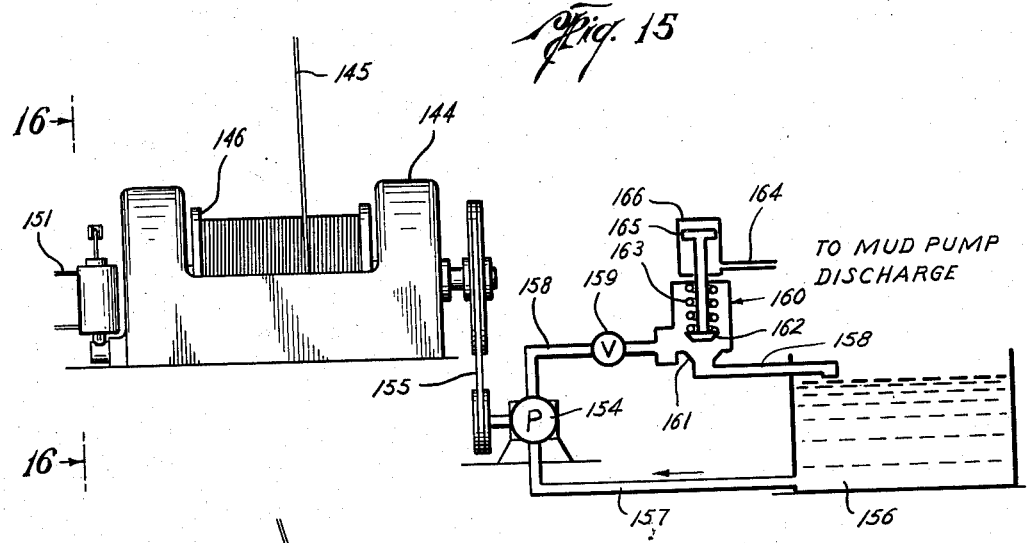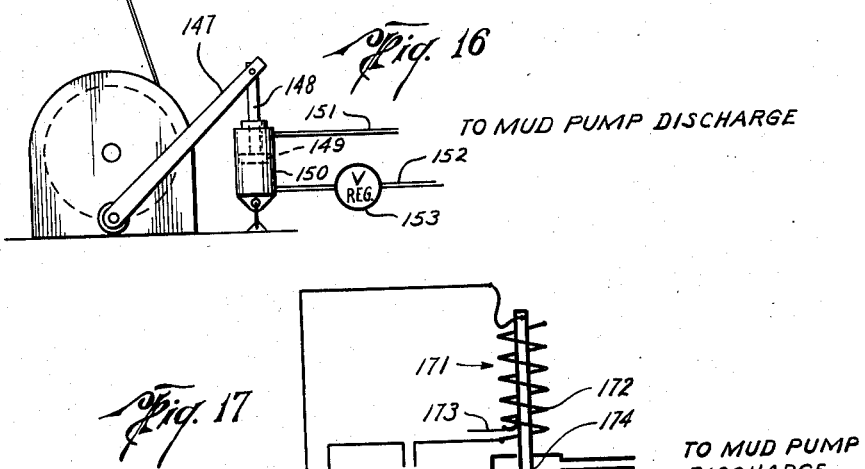

United States Patent Office 2,943,603
Patented July 5, 1960

2,943,603
FLUID ACTUATED IMPACT TOOL

Ross Bassinger, New Braunfels, Tex., assignor to Bassinger Tool Company, San Antonio, Tex.

Filed Sept. 16, 1954, Ser. No. 456,437

44 Claims. (Cl. 121—30)

This invention relates to an improved fluid actuated impact tool suitable for use such as in earth drilling. In one of its aspects, it relates to an impact tool having an improved fluid motor means for moving a hammer in its return stroke. In another aspect, it relates to a liquid actuated impact tool having an improved means arranged to apply the pressure of an actuating liquid to a hammer to move it without generating excessive pressure waves in such liquid so as to substantially reduce or entirely eliminate water hammer which would otherwise exist upon the application of such pressure. In another aspect, it relates to a fluid actuated impact tool having improved valving arrangements for variably controlling the application of the force of an actuating fluid to move a hammer. In another aspect, it relates to methods and systems for the control of fluid actuated impact tools. In still another aspect, it relates to an improved lock nut assembly finding particular application in the fluid impact tools of this invention. In another aspect, it relates to an improved connection between two relatively movable parts arranged so that the parts can move longitudinally with respect to each other but not rotatively.

One general object of the invention is to provide an improved impact tool, especially one for drilling bore holes in earth formations, wherein the application of an actuating fluid to a hammer to move it in one or both of its return and power strokes can be controlled so as to achieve one or more of the following advantages: (1) the hammer is permitted to deliver its blow to an anvil before there is any substantial application of actuating fluid to move it in its return stroke whereby the velocity of the hammer in its power stroke is not materially decreased prior to its striking anvil; (2) the application of force of a flowing actuating liquid to stop a hammer and then begin its movement in one of its strokes or to begin its movement in one of the strokes after it has been stopped is so controlled as to substantially reduce or eliminate excessive pressure waves ("water hammer") which would normally result from the sudden application of a flowing column of actuating liquid to the hammer to move the same; (3) the application of such force to the hammer is controlled so that the amount of applied force can be varied as the hammer moves in its stroke thereby permitting more efficient operation of the tool, for example, only a portion of the total available force of the actuating fluid can be applied to the hammer when it begins to move in one of its strokes and such portion can be increased as the hammer moves through such stroke so that the flow of actuating fluid is smoother and yet the hammer is accelerated so as to enable it to deliver a maximum of percussive energy to the anvil; and (4) the flow velocity of the actuating fluid flowing to or through the tool can be increased without decreasing the positiveness of the operation of the tool and without causing premature application of the force of the flowing actuating fluid to the hammer thereby permitting the maintenance of a predetermined hammer movement and application of forces thereto even when the flow of actuating fluid is varied from a predetermined minimum value to a maximum substantially unlimited by the tool itself.

It is another object of this invention to provide a fluid actuated impact tool in which the hammer is moved in its return stroke after it has struck the anvil by restricting the flow of the actuating fluid from the tool and in which an improved fluid motor or valve means is provided to so restrict the flow, such means including a time delay arrangement so that though the motor means restricts flow from the tool responsive to the hammer moving to anvil striking position, such restriction is delayed until after the hammer has struck the anvil. This permits the hammer to strike the anvil before the flow of actuating fluid is sufficiently restricted to materially reduce the velocity of the hammer and yet the restriction occurs upon the hammer striking the anvil.

Another object of the invention is to provide such a tool in which one valve element cooperates with another to restrict flow from the tool and thereby cause the hammer to move in its return stroke but is free to shuttle back and forth in the hammer so that it can lag behind the hammer during its power stroke to provide adequate flow capacity between itself and the other valve element upon the hammer striking the anvil and then move sufficiently close to the other valve element that fluid pressure can urge it and maintain it in flow restricting relationship therewith.

Another object is to provide such a tool in which such shuttle arrangement is combined with means permitting the valve members to remain seated while the hammer moves through at least a portion of its return stroke and then causing the valve members to be unseated and preferably moved apart so that not only is movement of the hammer in its power stroke substantially unrestrained by premature application of fluid pressure thereto to reverse it to its return stroke but it is also adequately powered in its return stroke.

Another object is to provide a fluid actuated impact tool in which the hammer is moved in its return stroke by restricting flow of fluid from the tool so as to increase the pressure of an actuating fluid applied to the hammer and wherein an improved valve means is provided to so restrict the flow, the valve means including elements carried by the hammer and the anvil in such a manner that hammer-carried element is held in a retracted position by a resilient means while the hammer is moving toward the anvil so that the hammer can strike the anvil before fluid flow between the elements is restricted to an extent to materially reduce the hammer's velocity but upon the hammer striking the anvil, the momentum of the hammer-carried element overcomes the resilient means to bring the valve elements in fluid restricting cooperation in order that the hammer can be moved in its return stroke.

Another general object of this invention is to provide a fluid actuated impact tool in which pressure waves which would normally result from the sudden application of force of a column of flowing actuating fluid to a hammer are substantially reduced or eliminated so that the operation of the tool becomes more efficient and the tool is not subjected to pressure waves of excessive intensity which would tend to either interfere with proper operation of the tool or subject its parts to excessive stresses. Thus, it has been previously suggested that a hammer be moved in one or both of its power and return strokes by the application of the force of a flowing column of actuating liquid thereto and such application is usually brought about by the closing of a valve. Since the actuating liquid at the moment the valve closes is flowing at a velocity greater than that of the hammer, the closing of the valve must suddenly slow down the column of actuating liquid and due to the latter's momentum, there results pressure waves of considerable magnitude (commonly termed "water hammer"). The extent of the "water hammer" problem can be visualized when it is considered that the column of actuating liquid may be freely flowing at a relatively high velocity (e.g. 10 feet per second) and must either reverse the direction of or start the movement of a hammer frequently weighing several hundreds of pounds in order that the liquid can continue flowing. The pressure waves thus resulting from the shock of the column of liquid suddenly slowing to the hammer's velocity can amount to many thousands of pounds per square inch. These pressure waves can result in erratic operation of the tool, excessive stresses to its parts, cavitation and unwanted application of forces to the hammer.

Another object of the invention is to provide an impact tool in which a portion of the actuating liquid is by-passed around a valve means so that when the latter is closed against a flowing column of the actuating liquid, force is applied to the hammer and yet excessive pressure waves or water hammer is substantially reduced or eliminated due to the by-passing of liquid.

Another object of the invention is to provide an impact tool in which the actuating liquid to be by-passed flows between two valve elements of the valve means when the latter is closed in order to not only reduce or eliminate water hammer but also to avoid one valve element impinging upon other when moving to closed position thereby eliminating the problem of damage to the valve seats as a result of such impingement.

Another object of the invention is to provide a fluid actuated impact tool having an improved valving arrangement wherein one valve element is disposed to move into a flow passage through another valve element to thereby restrict the flow of actuating fluid in order to move the hammer in one of its strokes while at the same time permitting a predetermined quantity of the fluid to by-pass the valve to avoid the sudden stoppage of the flowing actuating fluid.

Another object of this invention is to provide an impact tool in which an improved valving arrangement is employed to apply the force of a flowing column of actuating fluid to the hammer, the valving arrangement including one valve element which dives into a flow passage through another valve element to restrict flow therethrough and which moves with the hammer, while the latter is moving through a portion of one of its strokes, to be withdrawn from the passage thereby assuring that the valving arrangement, once the diving valve element has entered the passage in the other valve element, will continue to cause the force of the actuating fluid to be applied to the hammer throughout the desired portion of its stroke irrespective of whether the flow velocity of the actuating fluid be high or low and irrespective of any force exerted on the diving element by a means urging it away from the passage to a retracted position.

Another object is to provide an impact tool wherein a valving arrangement for applying the force of an actuating fluid to a hammer to move it in at least one of its strokes includes valve elements arranged to cooperate to cause such force to be so applied and then released and wherein one of the valve elements of the valving arrangement is provided with effective areas against which the actuating fluid can act in such a manner that such valve element is positively moved between extended and retracted positions at proper time intervals to provide the desired cooperation with the other valve element despite variation in the flow velocity of the actuating fluid from a predetermined minimum value to a maximum value which is substantially unlimited by the valving arrangement itself.

Another object is to provide such a tool wherein the valving arrangement includes one valve element arranged to reciprocate between extended and retracted positions with respect to another valve element so that the two elements cooperate to cause a driving force to be applied to and released from a hammer by an actuating fluid, the reciprocating element being moved between extended and retracted positions by applying the pressure of the actuating fluid acting on effective areas of such element in such a manner that the forces moving such element between its positions increase with increasing flow velocity of the actuating fluid thereby permitting greatly increased actuating fluid flow velocities without the flowing fluid either preventing the valve member from properly moving between its positions or causing it to move prematurely from one position.

Another object is to provide a fluid actuated impact tool wherein a valve element dives into a flow passage through another valve element to restrict flow through said passage in order that the force of an actuating fluid is applied to a hammer to move it in one of its strokes and wherein at least a portion of the passage is larger in cross-sectional area than the diving element to permit sufficient flow therethrough to reduce or eliminate water hammer and wherein the diving element is caused to dive into such passage and, upon movement out of the same with movement of the hammer, is caused to move to a retracted position by pressure of the actuating fluid acting on areas of the diving element arranged so that increased flow velocity of the actuating fluid results in increased force on the diving element to move it to retracted position against the increased resistance of the flowing actuating fluid thereto without increasing the force necessary to cause the diving element to move into said passage whereby the flow capacity of the passage with the diving element therein can be sized to accommodate high actuating fluid velocities and yet be operable at low velocities.

Another object is to provide such a tool having the above described diving arrangement of valve elements and wherein the valve elements are so constructed as to vary the cross-sectional area between the diving element and the walls of the passage in the other element as the hammer moves in one of its strokes whereby such area can be made quite large when the valve elements first cause the force of the actuating fluid to be applied to the hammer and then to decrease as the velocity of the hammer increases to approach that of the actuating fluid whereby the velocity of the actuating fluid can be increased to increase the ultimate velocity of the hammer without resulting in either excessive water hammer or in improper functioning of the valve elements.

Another object of the invention is to provide an impact tool wherein an improved valving arrangement is provided for controlling the application of an actuating fluid pressure to the hammer to move it in one of its strokes, the valving arrangement being such as to modulate or vary the pressure applied to the hammer while it is being moved through its stroke so that the velocity of actuating fluid flowing to the tool can be maintained relatively constant while avoiding water hammer and yet the hammer can be caused to achieve an ultimate velocity substantially equal to that of the actuating fluid.

In the type of impact tool to which this invention pertains, the arrangement is such that the frequency of beating of the hammer upon the anvil is a function of the distance between the fluid supply conduit with respect to which the hammer reciprocates and the anvil or work surface with respect to which the hammer also reciprocates. As such distance is decreased, the frequency of the hammer is increased, and vice versa, so that as the tool drills into the earth, for example, it is important to move the supply conduit downwardly at a similar rate if the frequency of the hammer is to be maintained at a desired value.

It is therefore another general object of this invention to provide a bore hole drilling system and method wherein a fluid actuated impact tool of this and other types having a similar characteristic of hammer beating frequency varying with the position of a supply conduit type can have the hammer frequency maintained at a predetermined value through a control system or method operating to maintain the distance between the supply conduit and the anvil or work surface substantially constant.

Another object of the invention is to provide such a control system in which the rate of movement of the supply conduit is controlled by means responsive to pressure of an actuating fluid flowing to tool or to the pressure drop across the tool so that such distance can be maintained substantially constant, it having been found that as such distance increases, the pressure of the actuating fluid or the pressure drop thereof across the tool decreases and vice versa.

Another object of this invention is to provide such a system in which the feed rate of a drill string into the bore hole is controlled by means responsive to the weight of the drill string which must be supported in the bore hole from the earth's surface so as to maintain the bottom-hole loading of the drill string on the supply conduit substantially constant, it having been found that the tool can be constructed so that in its operation, it will in itself support a portion of the weight of the drill string in the bore hole and as long as the frequency of the hammer is maintained constant, the portion of the weight supported by the tool will likewise remain constant. Accordingly, by maintaining a predetermined portion of the weight of the drill string to be supported at the surface of the earth or by maintaining a constant bottom-hole loading on the supply conduit, the distance between the fluid supply conduit and the anvil or work surface can be maintained at a predetermined value.

Another object is to provide a control system and apparatus for a tool of the type or types above mentioned wherein a weight or mass is provided to "float" or be supported above the hammer at a position dependent upon the beating frequency of the hammer so that by preselecting the quantity of such mass, the frequency of the hammer is determined and maintained at a desired value.

Another object is to provide such a system and apparatus wherein a supply conduit of predetermined weight has a sliding connection with a drill string and is provided with an effective area disposed so that the pressure of actuating fluid in the conduit urges it upwardly and away from the anvil or work surface so that as the hammer frequency increases from a predetermined value, the upward force on the supply conduit increases to move it away from the anvil or work surface thereby decreasing the frequency of the hammer back to said value, and vice versa.

In employing the tools of the type of this invention, it is not only necessary that the hammer be permitted to reciprocate but that it also transmit torque from the supply conduit or drill string to a tool, such as a bit on one end of an anvil so that the tool can be indexed rotatively for various purposes such as to enable a bit to take a new bite at the bottom of the bore hole. Since any joint between the conduit and hammer or between the hammer and tool permits reciprocation while limiting relative rotation between the parts it connects, improper construction can readily result in excessive friction in these joints and this has been particularly pronounced where considerable torque is transmitted through them. Such friction can not only reduce the ease of reciprocation of the hammer but it also makes joints susceptible to failure due to fatigue or other causes. Further, the joints must maintain the parts which it connects in proper axial alignment for free telescoping movement and prevent them from becoming axially misaligned. Any such misalignment, and indeed the force on the joint in maintaining proper alignment, can result in excessive rubbing and consequent galling of the joint. It is therefore another object of this invention to provide an improved telescoping or sliding joint particularly adapted for use in an impact tool under the adverse conditions frequently encountered in the drilling of a bore hole in the earth, the connection maintaining the parts which it connects in telescoping alignment and yet being capable of transmitting considerable torque without excessive friction developing so that the likelihood of the connection failing is reduced.

Another object is to provide such a connection in which the adjacent faces of the telescoping members are maintained in spaced relation by an arrangement of splineways and bearings or spacer members so that such faces are prevented from rubbing together to develop excessive friction in the connection.

Another object is to provide such a connection in which the bearings are of sufficient length as to in themselves maintain the telescoping members in proper axial alignment.

Another object is to provide such a connection in which the splineways are made of greater length than that of the bearings therein so that upon extension and retraction of one telescoping member with respect to the other, the bearings can lag behind the movement of one member so that the rate of relative movement between the bearings and either of the telescoping members can be less than that between the members themselves.

In tools of the type to which this invention pertains, it has frequently been necessary to employ a nut threaded on an element, such as where the nut serves as an abutment for a spring urging the element in one direction. Such element and its nut are frequently subjected to a reciprocatory motion having a frequency of many cycles per minute and further, their motion in one direction is frequently abruptly stopped by impingement of a stop part on the element with another stop part. These types of motions as well as the force exerted on the nut by a spring are all conducive to loosening or causing the nut to move out of its proper position on the element, particularly over long periods of time and under the adverse conditions frequently encountered in a bore hole. It is, therefore, another object of this invention to provide a stop nut assembly particularly adapted for use under circumstances encountered in impact tools and in which the nut can be positively maintained in a preselected position on an element despite severe stresses applied thereto tending to dislodge the same.

Another object is to provide such a nut assembly in which a nut threaded to an element is maintained in locked position by a pin which flexes portions of such element outwardly into tight frictional engagement with the nut.

Another object is to provide a stop nut assembly wherein the nut is prevented from rotating on an element to which it is threaded by means providing a releasable sticking frictional engagement between the nut and the element.

Other objects, advantages and features of this invention will be apparent to one skilled in the art upon a consideration of the written specification, the appended claims and the attached drawings wherein:

Figs. 1, 1A, 1B and 1C illustrate a preferred embodiment of the invention, it being understood that these four figures are continuations of one another from top to bottom in the order enumerated;

Figs. 2 and 3 are cross-sectional views taken on the lines 2—2 and 3—3 of Figs. 1 and 1A, respectively;

Fig. 4 illustrates an alternative embodiment which can be substituted for the structure shown in Fig. 1B for combination with the other structure shown in Figs. 1, 1A and 1C;

Figs. 5, 6, 7, and 8 illustrate schematically the operation of the impact tool shown in mechanical detail in Figs. 1 through 1C;

Figs. 9, 9A, 9B, and 9C illustrate the mechanical details of a more preferred embodiment of an impact tool of this invention, it being understood again that these four figures are continuations of one another from top to bottom in the order enumerated;

Figs. 10 and 11 are cross-sectional views taken on the lines 10—10 and 11—11 of Figs. 9 and 9B, respectively.

Fig. 12 illustrates another embodiment of a fluid motor or valve arrangement which can be substituted, for example, for the corresponding structure shown in Fig. 1 or 9 to be combined with the remainder of the structure shown in Figs. 1A–1C or 9A–9C;

Fig. 13 illustrates one embodiment of a control system and apparatus in accordance with this invention for controlling the beating frequency of a hammer of an impact tool having certain operating characteristics;

Fig. 14 is a general view illustrating a fluid actuated impact tool having certain characteristics disposed in a well and controlled by a system at the surface of the earth in order to maintain the beating frequency of the hammer at a predetermined value;

Fig. 15 is a detailed view of apparatus adapted to be employed in the system of Fig. 14 or others and illustrates a preferred embodiment of a control system for feeding drill string into a hole to maintain the beating frequency of an impact tool at a predetermined value responsive to the pressure of actuating fluid flowing to the tool;

Fig. 16 is a view taken on the line 16—16 of Fig. 15;

Fig. 17 illustrates an alternative embodiment of the control system shown in Figs. 15 and 16.

Fig. 18 is still another alternative embodiment of the control system of Figs. 15 to 17; and Fig. 19 illustrates still another type of control system wherein the rate of drill string feed is controlled to maintain the bottom-hole weight thereof substantially constant whereby an impact tool is maintained substantially at a predetermined operating frequency.

Like characters of reference are used throughout the several views to designated like parts.

Generally, the illustrated apparatus of this invention includes a hammer 10 mounted for reciprocation relative to a fluid supply conduit 11 and an anvil 12, so that a striking face 13 of the hammer can deliver a percussive blow to anvil face 14. In the preferred form, the tool includes alternately operable fluid motors here illustrated as an upper and a lower valve means 15 and 16 arranged so that upon closing the upper valve means, the hammer is urged by the pressure of an actuating fluid from conduit 11 in a power stroke to ultimately deliver a blow to the anvil. Then upon opening of the upper valve means and with the lower valve means closed, the pressure of the actuating fluid acts to move the hammer in a return stroke to complete the cycle.

Turning now to a detailed description of the tool illustrated in Figs. 1 through 1C, hammer 10 is comprised of a plurality of sections detachably joined together to permit ready assembly of the tool. These sections include a heavy walled section 10a, a section 10b having a reduced diameter portion telescoping in conduit 11 and surmounted by a tubular section 10c, a lower valve housing section 10d and an impact section 10e.

Fluid supply conduit 11 can be composed of a plurality of lengths 11a 11b, and 11c with the latter adapted to be connected to a drill string.

The lower end of anvil 12 can be formed with a connection (not shown) such as a threaded joint, for attachment to a bit or other tool.

Since fluid supply conduit 11 is maintained relatively fixed in elevation with respect to its operating environment such as a bore hole, during any one phase of the drilling operation, and since hammer 10 reciprocates relative thereto, a slidable connection is provided between these two elements and is arranged to permit relative longitudinal movement therebetween but to restrain relative rotation so that the drill string can be rotated to index the bit for a new bite on the bottom of the bore hole. According to one feature of this invention, an improved telescoping connection between the hammer and supply conduit is provided and includes telescoping parts carried by the hammer and conduit, such as the reduced diameter portion of section 10b of the hammer and section 11a of the supply conduit. As is shown in Figs. 1A and 3, the adjacent faces of the reduced diameter portion and of the external section 11a are supplied with a plurality of splineways 17 and 18, respectively, which extend longitudinally of these parts with each of the splineways 17 being in radial alignment with one of the splineways 18 so as to receive bearings 19 therein. The maximum outside diameter of the reduced diameter portion of section 10b is preferably made smaller than the minimum inside diameter of external section 11a so that adjacent faces 17a and 18a between these two parts are spaced apart. The bearings are of such diameter relative to the total radial depth of the paired splineways that they bridge across the spacing between these two faces. Thus, since the pairs of splineways are spaced circumferentially about these adjacent faces, the faces are maintained in laterally spaced apart relationship while the telescoping connection is being contracted and extended. As a result, faces 17a and 18a do not rub on each other and substantially all of the sliding friction between the two telescoping parts is taken in the bearings.

Each of splineways 17 and 18 preferably have their lengths substantially greater than the combined length of bearings 19 contained therein so that the bearings, upon extension and contraction of the telescoping connection or joint, are free to lag behind the movement of one of the telescoping parts 10b and 11a. In this manner, the relative rate of movement between the bearings and either or both of thest parts can be less than that between the parts themselves. Thus, the bearings are free to "float" somewhat in the splineways and to turn and continuously present new bearing faces to the walls of the splineways.

In Fig. 1A, bearings 19 are illustrated as comprising ball bearings but it will be understood that they can be all roller bearings as shown in Fig. 9A or a mixture of roller and ball bearings, as shown in Fig. 9C, the latter being preferred.

Splineway 17 has inturned terminus 20 while splineway 18 has a similar terminus 21 formed on a removable part 21a. Each of these terminii are adapted to engage one end of bearings 19 to limit extension of the telescoping connection. Part 21a is made removable fom the fluid supply conduit so that in assembling the joint, the bearings can be inserted into their respective splineways and then part 21a attached to section 11a as a retainer.

It will be noted that with this type of telescoping connection, the combined length of bearings 19 within a pair of splineways is such as to present a bearing area extended along a substantial length of such pair of splineways and hence of the telescoping connection so that the bearings themselves tend to prevent any substantial axis misalignment between the telescoping members. Thus, friction between the telescoping parts is reduced to a minimum thereby permitting relatively free longitudinal movement between the parts and yet restraining them against relative rotational movement so that torque can be transmitted from the supply conduit to the hammer and thence to the anvil to roate and index the bit attached to the anvil.

Since the bit or any other tool attached to the anvil rests on the surface to be worked, such as the bottom of a bore hole, during the operation of the tool and hence is fixed relative to the reciprocal hammer, a telescoping connection can be provided between the hammer and anvil similar in construction to the one described above. Thus, in this instance, impact section 10e of the hammer and reduced diameter portion 12a of the anvil comprise the outer and inner telescoping parts, respectively. Otherwise the elements of the connection are the same as above described and hence have been given like reference characters. It will be noted, however, that a threaded joint is provided at 10f to permit assembly of the telescoping connection. Also, extension of the telescoping joint is limited by stop parts 23 and 24 comprising respectively a nut carried on the anvil and locked in position by a lock nut 23a and a shoulder formed on the upper end of heavy walled section 10a.

As a part of the fluid motor means for actuating the hammer in its return stroke, it is provided with an effective area disposed so that pressure fluid from supply conduit 11 can act thereagainst to move the hammer in at least a portion of its return stroke. Flow control means are also provided to vary the degree of fluid communication between such area and the exterior of the tool so that the pressure of the actuating fluid exerted on this area can be increased to move the hammer in its return stroke and then decreased to permit movement of the hammer in its power stroke. As a fluid motor means for moving the hammer in its power stroke, it preferably is provided with an area disposed so that pressure fluid acts on such area to urge the hammer toward the anvil and flow control means are also provided to control the application of pressure to this area. Thus, the upper end of the hammer shown in Fig. 1 can be provided with piston means comprising a piston 25 connected, as by threads 26 and retainer pin 27 to the top of section 10c of the hammer and having a bore 28 communicating between the fluid supply conduit and passageway 29 in the hammer. Piston 25 can have a resilient seal 25a and one or more piston rings 30 adapted to form a sliding seal with the bore walls 31 of cylinder 32 of fluid supply conduit 11 in which the piston reciprocates with the upper end of the hammer.

As a part of the piston and flow control means, piston 25 is provided with a valve seat 33 surrounding bore 28 so that the piston also functions as a valve element. Means are provided for mounting another valve element 34 to be slidable or reciprocal with respect to the supply conduit. Element 34 has a seat 35 adapted to mate with seat 33 of the piston and thereby control flow of fluid from the supply conduit into passageway 29 of the hammer. It is apparent that with valve element 34 seated, fluid from conduit 11 acts across the entire cross-sectional area of the piston within cylinder 32 to urge the hammer in its power stroke toward the anvil. Also, upon unseating valve element 34, the endwise area of piston 25 exposed to pressure fluid from the conduit is reduced due to the opening of passages 28 and 29 through the piston and hammer.

As mentioned above, means are provided for slidably mounting valve element 34 in the fluid supply conduit so that it can remain seated with the valve element on the hammer while the hammer is traveling through at least a portion of its power stroke and then be unseated to permit actuating fluid to flow into hammer passage 29. In a preferred form, resilient means are provided for biasing valve member 34 upwardly so that it will move to a retracted position after it has been unseated from piston 25. Also, the arrangement is such that after valve element 34 seats with the hammer-carried element, the two are free to travel upwardly with the hammer until the latter's directional movement is reversed and it is moved into its power stroke. Thus, cage 36, which has fluid passages 37 therethrough, is arranged to normally rest upon a shoulder 38 in the fluid supply conduit but to be free to move upwardly, as illustrated in Fig. 1, to permit it to ride up with the hammer. While shoulder 39 can be provided to prevent the cage from being dislodged from the tool, the distance between shoulders 38 and 39 minus the distance between shoulders 41 and 41a should be greater than any contemplated overtravel of the hammer in order to prevent any solid metal-to-metal connection between shoulder 39, cage 36, valve element 34 and the hammer while the latter is moving upwardly which would injure the relatively lightly constructed valve parts.

Valve element 34 is slidably received in bore 40 of the valve cage so that it can travel downwardly in seated position with the hammer even after shoulder 41 of the cage comes to rest upon shoulder 38 of the supply conduit. In order to unseat valve element 34 so as to permit flow of pressure fluid into the hammer and to decrease the effective area acted on by the pressure fluid in opposing movement of the hammer in its return stroke, actuating means are provided for this purpose and are made responsive to movement of the hammer so as to open the upper valve means 15 when the hammer has passed through a predetermined portion of its power stroke and to permit the valve means to close at the end of or during the hammer's return stroke. Thus, stop parts 42 and 43 are provided respectively on the cage and the valve element for engagement after the valve element has traveled downwardly with the hammer a predetermined distance. A resilient means, such as spring 44, is also provided between the cage and nut 45 to move valve element 34 upwardly to a retracted position after it has been unseated and to bias it to a position intermediate the extremities of its path of travel while in seated position on piston 25 and hence while traveling with the hammer.

Lower valve means 16 (Fig. 1B) controls communication between the interior of the hammer and the exterior of the tool and can also comprise piston means including piston 46 carried by the anvil, such as by being threaded thereto by threads 47 and pinned in place by pin 47a. Piston 46 is reciprocally received in a cylinder 48 in the hammer defined by bore walls 49 and can be provided with a sealing ring 50 and piston rings 50a to effect a sliding seal with the walls of the cylinder. The piston is provided with a passage 51 communicating with passage 52 in the anvil which leads to the exterior of the tool, as through the bit, so that fluid can be exhausted from the tool.

In order to control this exhausting of fluid and hence the pressure of fluid upstream of piston 46, the latter is also formed to act as a valve member such as disposing a valve seat 53 thereon to surround passage 51 and to mate with a seat 54 on a valve member 55. Means are provided for reciprocally or slidably mounting the valve member on the hammer for longitudinal movement with respect thereto so that the valve member can remain in seated position on piston 46 during at least a portion of the return stroke of the hammer and then be unseated to thereby permit flow out of the tool. Thus, valve member 55 can be slidably carried by a cage 56. To unseat valve member 55 upon travel of the hammer a preselected distance from its anvil striking position, actuating means responsive to movement of the hammer are provided for effecting such function. Thus the upper end of the valve member is provided with a nut 57 arranged with a shoulder 58 which acts with end 59 of the valve cage to constitute mutually engageable stop parts to limit movement of the valve member with respect to the hammer. Resilient means, such as spring 60, are provided for urging and moving valve member 55 to a retracted position after it has been unseated from seat 53. The lower end 61 of cage 56 and the annular retainer 62 can act as mutually engageable stop parts for limiting upward movement of the valve member under the influence of spring 60. An annular buffer 63 of resilient material, such as rubber, can be provided between retainer 62 and the head of the valve member to cushion the upward movement of the valve member upon engagement of stop parts 61 and 62. If desired, an outer lip 63a of buffer 63 can extend to form a seal with the upper face of piston 46 or to cushion the shock of valve member 55 seating with piston 46.

In accordance with one feature of the invention, the arrangement of the valve means 16 is such as to include a time delay means so that the hammer can deliver a blow to the anvil before the lower valve means substantially restricts fluid flowing from the tool but upon delivery of the blow, the valve members of the lower valve means move into sufficient proximity with each other as to restrict flow and cause the pressure of the actuating fluid to urge them to and maintain them in fluid restricting cooperation with each other during at least a portion of the return stroke of the hammer.

Thus for the embodiment of Figs. 1–1C and 4, the mounting means for valve member 55 includes a shuttle connection permitting the valve member to lag sufficently behind the hammer during the latter's power stroke so that upon the hammer striking the anvil, restriction of fluid flow between valve member 55 and piston 46 is insufficient to materially reduce the hammer's velocity before it strikes the anvil. The shuttle connection then permits the downward momentum of valve member 55 to move it downwardly toward piston 46 after the hammer has struck the anvil so that the flow of actuating fluid therebetween is restricted and the resulting pressure differential urges valve member 55 toward and maintains it in seated position.

It might be possible to achieve the same effect as provided by the above-described shuttle connection by fixedly connecting cage 56 to the hammer and arranging valve member 55 so that spring 60 could urge it to a retracted position such that there would be substantially no fluid restriction between seats 53 and 54 prior to the hammer striking the anvil and then to depend upon the downward momentum of the valve member 55 to cause it to move against spring 60 and far enough toward seated position that the actuating fluid could urge it to and maintain it in seated position on piston 46. However, with such construction, it would be difficult to start the tool in operation because when the tool is initially placed in operating position with the hammer resting on the anvil, valve member 55 has no downward momentum to carry it into fluid restricting relationship with piston 46. Thus, in order to start the tool, the valve member should be in an at-rest retracted position such as to be sufficiently close to the piston so as to at least initially restrict flow therebetween so that the fluid can move it to or maintain it in seated position.

One means of providing a shuttle connection is illustrated in Fig. 1B wherein valve cage 56 is made slidable within a bore 64 in the hammer so that it can shuttle back and forth between opposing shoulders 65 and 66. Spacer rings 67 can be employed to adjust the shuttle distance as well as the spacing of seat 54 from seat 53 when the cage is in its lowermost position. With this construction, it will be apparent that as the hammer moves upwardly in its power stroke and valve member 55 is maintained on seat 53 by the pressure of actuating fluid within the hammer, valve cage 56 and the lower spacer ring 67 will remain in abutment with shoulder 66. However, upon the hammer reversing its upward direction and then moving downwardly in its power stroke, the upward momentum of cage 56 moves it upwardly relative to the hammer to bring the upper spacer ring 67 into abutment with shoulder 65. Then, upon the hammer striking the anvil, there will be a vertical clearance between valve seats 53 and 54 equal to the shuttle distance marked "s" in the drawing and such distance should be great enough that the restriction of fluid flow between seats 53 and 54 is insufficient to materially reduce the downward velocity of the hammer before it strikes the anvil.

Before explaining further the positioning and cooperation of the valve means 15 and 16 with the other parts of the tool, it would probably aid in the understanding thereof to trace the path of fluid flow through the tool. The fluid enters via passage 11f (Fig. 1) and then flows downwardly through cage passage 37 and into cylinder 32. When the upper valve means is open, the fluid will continue flowing downwardly through passages 28 and 29, passages 65 in valve cage 56, and into cylinder 48. When the lower valve means is in open position, the fluid continues flowing through passages 51 and 52 and thence out of the tool, such as through the bit.

As stated above, the hammer is provided with an effective area against which fluid from the supply conduit can act to urge the hammer in a power stroke toward the anvil and with a larger opposing effective area against which the pressure fluid derived from the supply conduit can act to urge the hammer away from the anvil. For the construction shown in the drawings, it will be apparent that with valve means 16 open and valve element 34 seated on piston 25, fluid in conduit 11 acts on an area equal to the cross-sectional area of piston 25 to urge the hammer toward the anvil; the force exerted on the hammer by the fluid being equal to the differential pressure across piston 25 multiplied by the cross-sectional area of the piston.

With valve means 15 open and valve member 55 seated on piston 46, pressure from the supply conduit will act against piston 46 and attempt to move the anvil away from the hammer. Since the anvil is substantially fixed in its longitudinal position with respect to the supply conduit, such pressure fluid will act to urge the hammer away from the anvil and by making piston 46 of larger cross-sectional area than that of piston 25, pressure fluid from the conduit acts on an effective area equal to the difference between the cross-sectional areas of the two pistons to urge the hammer away from the anvil. When the hammer has moved away from the anvil a sufficient distance, stop parts 58 and 59 become engaged. At such time, the force resulting from pressure in cylinder 48 acting across the area of valve seat 53 to resist unseating of valve member 55 therefrom becomes effective in resisting movement of the hammer in its return stroke. Ordinarily, the upward momentum of the hammer at this point (i.e. with stop parts 58 and 59 in engagement) is sufficient when the hammer has achieved its normal operating frequency to pull valve member 53 off its seat. However, in a preferred embodiment of the tool, the effective area across seat 53 is made less than the difference in cross-sectional areas between pistons 25 and 46. With such construction, the hammer will always be positively moved through its return stroke including the unseating of valve member 55 irrespective of the upper momentum of the hammer.

It may be of some aid in understanding the above described arrangement of areas and forces acting on the hammer to state the same mathematically for the tools shown in the drawings. Thus,
Given:
(1) Cross-sectional areas of pistons 25 and 46 are denoted as 25A and 46A, respectively.
(2) Cross-sectional area of valve seat 53 is denoted as 53A.
(3) Cross-sectional area of passage 28 is denoted as 28A.
(4) Pressure of fluid in the supply conduit is P (assume pressure exteriorly of tool is zero).
(5) 46A is greater than 25A.
(6) 53A is less than 46A minus 25A.

Then:
Case 1—

If valve means 15 is open and valve means 16 closed, the force acting downwardly on the hammer before stop parts 58 and 59 engage is $$P(25A - 28A)$$

and the force acting upwardly on the hammer is $$P(46A - 28A)$$

Therefore, the resultant force acting upwardly on the hammer is $$P(46A - 28A) - P(25A - 28A)$$

which, removing parentheses, becomes $$P46A - P28A - P25A + P28A$$

or $$P46A - P25A$$

Then, since 46A is greater than 25A, the resultant force on the hammer is upward and it moves away from the anvil.

Case 2—

If valve means 15 is open and valve means 16 closed but the hammer has moved away from the anvil far enough to engage stop parts 58 and 59, then neglecting upward momentum of the hammer, the force acting down on the hammer is $$P(25A - 28A) + P53A$$

and the force acting upwardly on the hammer is $$P(46A - 25A)$$

Hence, the resultant force acting on the hammer is $$P(46A - 25A) - P(25A - 28A) - P53A$$

or $$P(46A - 25A - 53A)$$

Then, since 46A−25A is greater than 53A and since 46A is greater than 25A, the resultant force on the hammer is upward and the hammer will move away from the anvil and unseat valve member 55 irrespective of the upward momentum of the hammer.

Thus it will be apparent that with valve means 15 open and valve means 16 closed, the total area of all surfaces on the hammer which are exposed to pressure fluid from the supply conduit and which are also disposed so that such fluid can act to urge the hammer away from the anvil must be greater than the total area of all surfaces likewise exposed to such pressure fluid and disposed to permit the fluid to urge the hammer toward the anvil. It will also be apparent that this differential in area upon which pressure fluid effectively acts to move the hammer in its return stroke is situated upstream of valve means 16 so that by alternately opening and closing this valve means, pressure on the effective differential area is increased and decreased to respectively move the hammer in its return stroke and to permit it to move in its power stroke.

The sequence of operation of the valve means and other parts of the illustrated tool as thus far described is believed to be apparent from the foregoing. However, a description of the operation of the tool may be of further assistance in understanding such sequency as well as the required spacing of the various valve elements and members to achieve its sequence.

In Figs. 1 through 1C, the tool is shown with its parts disposed in the position they occupy when no fluid is flowing through the tool and when the latter is telescoped to its most collapsed position. Referring to Fig. 5, the tool is shown as it is being lowered into a bore hole so as to rest a bit 22 on the bottom thereof. As the bit reaches the bottom, the telescoping connection between the hammer and anvil contracts until hammer face 13 rests on anvil face 14 at which time valve member 55 is either seated on piston element 46 or is positioned closely enough thereto that fluid flow therebetween is restricted so that the fluid moves the valve member 55 to seated position. The drill string, which extends to the surface for connection with a source of actuating fluid, such as a drilling mud, can be maintained in this position and the flow of actuating fluid started. Since valve element 55 is then positioned to block flow from the tool, the fluid will act on the differential area to move the hammer into its return stroke as shown in Fig. 6. After the hammer is moved through a predetermined portion of this stroke, valve member 55 will be unseated and the hammer can continue coasting upwardly. If the tool is desired to single act, the supply conduit is situated far enough from the anvil that the hammer coasts to a stop before it engages valve element 34 and then falls by gravity to strike a blow on the anvil. In this connection, upper valve means 15 can be entirely eliminated or substituted by resilient member such as the spring to move the hammer in its power stroke. However, in a much preferred form of the tool, valve means 15 is employed and the fluid supply conduit is lowered to a position such that when liquid is used as an actuating medium, valve member 34 will seat with piston 25 at a time after valve member 55 has been unseated. This closing of valve means 15 brings the actuating fluid to bear upon the hammer to reverse its direction and cause it to move downwardly in a power stroke. Since the hammer usually does have some upward momentum remaining after seating of valve member 34, it will move the valve member and its cage 36 upwardly to space shoulder 41 from shoulder 38. The distance the hammer travels from the point at which valve means 15 closes until its direction is reversed can be termed "overtravel."

Upon reversal of the hammer from its return to its power stroke, the upward momentum of cage 56 and the parts carried thereby causes it to move upwardly relative to the hammer until it is stopped by shoulder 65.

As the hammer moves downwardly (Fig. 7), valve element 34 is maintained on seat 33 by the pressure of the actuating fluid in the supply conduit so that cage 36 also moves downwardly to bring shoulders 41 and 38 into abutment after which spring 44 is compressed until shoulders 42 and 43 engage. Thereupon, valve element 34 is unseated leaving spring 44 free to move valve element 34 upwardly until stop parts 34a and 36a are in abutment.

The hammer continues in its power stroke until it strikes the anvil (Fig. 8). At such time, cage 56 is still in its upper position but will immediately move downwardly so that valve member 55 can seat with piston 46. The cycle of operation is then repeated.

The distance the hammer travels from its uppermost point where overtravel ceases until valve element 34 is unseated can be termed the "push-down stroke" and the distance it travels from anvil striking position until valve member 55 is unseated can be termed the "push-up stroke."

From the foregoing, it is apparent that the position of valve member 55, with parts 61 and 62 in abutment, is such that the longitudinal spacing between seat 54 and hammer face 13 is equal to the spacing between seat 53 and anvil face 14 so that upon the hammer striking the anvil, there will exist no "standoff" space or distance between seats 53 and 54. If desired, the longitudinal spacing between seat 54 and hammer face 13 can be increased to provide a standoff space between provided that with the hammer on the anvil, such standoff space is not so excessive that fluid flow between the valve seats 53 and 54 will not be restricted sufficiently to create a pressure differential across valve member 55 to urge it across the standoff space into seated position. Such an arrangement would provide a maximum flow capacity between the valve seats when the hammer strikes the anvil because the spacing between the seats would then be equal to the shuttle distance "s" plus the standoff distance. On the other hand, a "negative" standoff space can be provided by making the distance between seat 54 and face 13 less than that between seat 53 and face 14. This merely means that the lower end of valve cage 56 will not come to rest upon spacer 67 and shoulder 66 when the hammer strikes the anvil. At any rate, with valve member 55 seated, the spacing between shoulders 58 and 59 will be equal to the push-up distance of the hammer during its return stroke with the total length of return stroke then being equal to the push-up plus the over-travel plus the distance the hammer may coast between the end of the push-up stroke and the beginning of over-travel.

The upper valve element 34 is positioned in the supply conduit, when the latter is properly positioned for its telescoping connection with the hammer to be freely effective, so that the valve element will seat upon seat 33 of piston 25 at some time after stop parts 58 and 59 engage to unseat the lower valve member. The supply conduit's telescoping connection with the hammer is sufficiently long that the supply conduit can be freely raised and lowered to vary the distance the hammer travels (coasts) after the lower valve member is unseated and before the upper valve element is seated and to thereby vary the frequency of the hammer movement.

In accordance with another feature of the invention, shock or pressure waves, commonly termed "water hammer," which normally occur upon closing of a valve against a flowing column of liquid are substantially reduced or eliminated by providing a by-pass passage or passages from the upstream side of closed valve means 15 and/or 16 so that the flow of fluid through the tool is not totally restricted but a sufficient portion continues to flow even with the valve means closed to reduce the intensity of or substantially eliminate the shock waves and yet the flow is sufficiently restricted by the valve means so that the pressure of the actuating fluid moves the hammer in its power and return strokes.

As will be seen from Figs. 1–1C, when valve element 34 seats on piston 25 the flow of actuating liquid or fluid ceases through passage or bore 28. Accordingly, the liquid is trapped in closed cylinder 32 and further flow through the supply conduit ceases until the hammer is moved downwardly to increase the volume of cylinder 32 above piston 25. Usually valve element 34 becomes seated on piston 25 while the hammer is still moving upwardly to decrease the volume of cylinder 32 thereabove. This means then that the flow of the column of actuating liquid is not only suddenly stopped but that its flow may be actually locally reversed. As a result of the sudden stoppage of the actuating liquid, a positive pressure wave of considerable magnitude is developed and applied to the upper valve means causing excessive stresses therein. Further, the pressure wave is reflected up the column of actuating liquid to be exerted on the drill string, mud pumps and the like and also causes a low pressure to develop adjacent the upper valve means tending to jerk it off its seat. The high pressure wave may be reflected several times up and down the drill string and is joined by similar waves caused by subsequent closing of the upper valve means as the hammer repeats its cycle. As a result, the operation of the upper valve means can become erratic, considerable damage can occur to the tool, the drill string and attendant equipment and the force driving the hammer in its power stroke can become fluctuating in nature resulting in an overall decrease in operating efficiency of the tool.

The sudden closing of the lower valve means can produce similar results and indeed, the pressure waves generated by closing of one valve means can affect the operation of the other valve means.

As mentioned above, means are provided for preventing or smoothing out the pressure waves so that operation of the tool becomes more positive and efficient.

Thus shown in Fig. 1, a by-pass passageway 70 is provided through a pin 71 to communicate with a passage 72 in valve element 34. Another form of by-pass passageway is shown in Fig. 1B as comprising a port 72a as in piston 46 communicating between the upstream and downstream side of valve seat 53. A similar arrangement can be substituted for passageway 70 shown in Fig. 1. The size of these passageways should be sufficiently large that their flow capacity prevents, relieves or smooths out the peaks of the positive pressure shock waves to an extent that water hammer is substantially reduced or eliminated. However, the passageways must be small enough that their flow capacity is substantially less than that required to move the hammer at a reasonable velocity. Further, the passageways must be sufficiently small that the necessary pressure differential can be maintained across the valve elements or members to keep them seated while the respective springs 49 and 60 are being compressed. Thus, for example, if passageway 70 is made too large, the resulting differential of pressure across valve seats 33—35 will be reduced to an extent such that spring 44 will unseat valve element 34 before stop parts 42 and 43 engage, thus robbing the hammer of the maximum power available to increase its velocity during its power stroke.

When the by-pass passageways are not employed and with liquid as an actuating fluid, it is necessary that the valve means 15 and 16 never be closed at the same instant in order to avoid hydraulic lock of the hammer. By making the by-pass passageway around the lower valve means of lesser flow capacity than that around the upper valve means, it will be possible to close the upper valve means before the lower one has been opened without hydraulically locking the hammer. Thus, the actuating liquid can flow into the hammer passage between the two valve means faster than it can flow out of it. As a result, the hammer will continue moving upwardly until the lower valve means has been opened and since spring 60 moves valve member 55 upwardly immediately thereafter, the hammer is free to move downwardly in its power stroke under the influence of pressure applied across upper piston 25. While this type of operation is generally not preferred because it reduces the beating frequency of the hammer, it is possible for the tool to be so employed with the above arrangement thereby giving it greater flexibility of operation.

Referring now to Fig. 4, there is shown an alternative form of lower valve means 16 which illustrates another construction for affording the shuttle connection between the hammer and valve member. Thus, in this instance, valve member 55a has a seat 54a matable with seat 53 on piston 46 and is slidably mounted on intermediate member 73 which in turn is slidably carried by cage 56a. A resilient means such as spring 60a is provided between a nut 57a on the valve member and an abutment 74 on intermediate member 73. Stop parts 75 and 76 are provided to limit the extent to which the spring 60a can move the valve member with respect to the intermediate member. Abutment 74 also serves to limit movement of the valve member and the intermediate member toward piston element 46, as by abutment with the upper end 77 of the cage. With this construction, it will be apparent that the valve member and intermediate member are free to shuttle as a unit with respect to the hammer from the valve member's retracted position as shown in Fig. 4 to a more remote position from piston 46. This shuttle distance is again designated in the drawings by the letter "s." Thus, the valve member is free to shuttle in the cage which is fixedly carried by the hammer. In this connection, the valve cage is securely fastened in place so as to prevent end play thereof while at the same time providing this securement to permit reasonable manufacturing tolerances for the cage and sections 10b and 10d. Thus, a heavy spring 78 is disposed between inwardly extending shoulder 79 on hammer section 10b and end 80 on valve cage 56a so as to urge the latter against spacer rings 67a which in turn abut a shoulder 81 on hammer section 10d. Spring 78, in an unstressed condition, has a length substantially greater than the maximum distance which will exist between the upper end 80 of the valve cage and shoulder 79 when maximum variations in manufacturing tolerances are taken into account. The spring is sufficiently strong so that upon making up of threaded joint 82, the resulting compression of the spring causes it to securely hold the valve cage tightly in place against the spacer ring 67a and to prevent any lengthwise shifting thereof during reciprocation of the hammer. As a result, shoulder 79 can vary within relatively broad limits in its proximity to end 80 of the valve cage and yet the latter is fixedly secured in place in the hammer.

The number or width of the spacer rings 67a can be varied in order to adjust the standoff distance "s o" or to eliminate the same altogether as discussed above. In any event, the sum of the shuttle distance "s" and the standoff distance "s o," if any, should be sufficiently great that the clearance between seats 53 and 54a with part 82a of the valve member and the lower end 83 of the valve cage in abutment, so that flow of actuating fluid through the tool is insufficiently restricted to materially reduce the downward velocity of the hammer.

With the foregoing construction, it will be apparent that as the hammer moves upwardly in its return stroke, pressure will maintain valve member 55a on seat 53 until parts 58a and 59a are in abutment after which the valve member will be unseated to be moved to retracted position by spring 60a. Upon reversal of the hammer's upward movement and starting it in its power stroke, valve member 55a and intermediate member 73 will lag behind the hammer so that parts 82a and 83 are in abutment. At the time that the hammer strikes the anvil, the valve member and intermediate member 73 move downwardly to space seat 54a a distance "s o" from seat 53. This space "s o" should be small enough that flow of fluid between the valve seats is sufficiently restricted that the resulting differential in pressure thereacross can urge the valve member to and maintain it in seated position.

Still another means for providing the shuttle connection of the lower valve member with the hammer is to fasten intermediate member 73 (Fig. 4) to cage 56a, such as by making it integral therewith, and then providing spring 60a to be of a length, at no-load condition, such that the shuttle distance "s" exists between stop parts 75 and 76. That is, the valve member is mounted slidably in a cage fixedly carried by the hammer and the spring for moving the valve member to retracted position is made short enough at no-load condition that the valve member is free to travel upwardly away therefrom for the required shuttle distance when the hammer moves into its power stroke. The valve member is also free to move downwardly into positive engagement with the spring upon the hammer striking the anvil to thereby position the valve member the desired standoff distance, if any, from the piston element.

While the valve element 34 is shown in the drawings as being slidably supported by the fluid supply conduit and as biased to a retracted position by a spring in order that the push-down stroke of the hammer can be of sufficient length to give the hammer a desired high velocity for its power stroke, it is possible to eliminate this spring. Thus, valve element 34 will, in an at-rest position, rest with parts 42 and 43 in abutment with such arrangement, the push-down stroke of the hammer will be equal to the overtravel since the maximum separation of parts 42 and 43 will be equal to the distance the hammer travels with valve element 34 seated on piston 25. Such a mode of operation is satisfactory when the overtravel is great enough to give a push-down stroke such as to increase the hammer velocity so to yield the desired percussive energy for delivery to the bit. It does have the advantage of eliminating a spring from the upper valve means but usually a greater amount of acceleration of the hammer during its push-down stroke is desired than can be accomplished by this arrangement.

In accordance with another feature of this invention, a tool is provided which not only has the advantages of the tool illustrated in Figs. 1–1C but certain additional ones such as (1) the amount of fluid by-passed around valve means 15 or 16 can be varied in accordance with the position of the hammer whereby the force exerted by the actuating fluid in the hammer can likewise be varied during any portion of or all of its push-up or push-down stroke thereby enabling maximum acceleration of the hammer and yet avoiding water hammer even at high rates of flow, (2) increased flow of actuating fluid though the tool does not render its action erratic but, on the contrary, even more positive, and (3) impingement of one valve seat on another is eliminated.

Thus, referring to Figs. 9 through 9C, an improved valving arrangement is provided for securing one or more of the above advantages and, as to the upper valve means, the arrangement can include a piston 90 connected to the upper end of hammer section 10c so that it reciprocates in bore 91 defining cylinder 92 in the fluid supply conduit. A passage, generally designated by the numeral 93 and forming a part of the flow passageway through the tool, is provided in piston 90. Valve element 94 is slidably carried by the supply conduit to dive into passage 93 or to be positioned therein in order to restrict fluid flow therethrough so that the pressure of the actuating fluid flowing through supply conduit can act across the hammer's piston 90 to reverse its direction of travel and then move it in its power stroke.

Means are provided for permitting and causing valve element 94 to move with respect to piston 90 into passage 93 when the hammer and piston move into sufficient proximity thereto. Means are also provided for moving the valve member to retracted position after it has moved out of passage 93. Thus, there is provided a valve cage 96 maintained in place in the fluid supply conduit by a spring 97. This spring is employed in the same manner as spring 78 in Fig. 4 and abuts one end against an adapter ring 98 and the other against one of a plurality of spacer rings 99. The spacer rings can be employed to adjust the vertical level of cage 96 in the supply conduit.

Extending from valve element 94 is a stem 100 which not only supports the valve element but in itself aids in the restriction of flow through passage 93. This stem has a sliding connection via bore 101 of the valve cage and includes a reduced diameter portion 102 terminating in a piston 103. The piston is slidable within cylinder 104 and can be provided with suitable packing 103b to form a sliding seal with the cylinder. Cylinder 104 and bore 101 of the valve cage act with the piston and valve stem slidable therein to maintain valve stem 100 and valve element 94 in axial alignment with passage 93.

Cylinder 104 is connected to a low pressure source such as by passage 105 to the exterior of the tool so that end 103a of the piston is exposed to low pressure fluid thereby providing a resilient means tending to urge piston 103 and valve element 94 from retracted to extended position and in a direction toward piston 90. A small fluid passage 102a can be provided to maintain cylinder 104 free from dirt, etc.

Upward movement of the valve element assembly (comprising valve element 94, stem 100, reduced diameter portion 102 and piston 103) from extended position (Fig. 9) toward retracted position is limited by stop part 106 coming into abutment with stop part 107. Downward movement of the valve element assembly from retracted to extended position is limited by stop part 108 abutting stop part 109 which can be an upper end of the valve cage. In this manner, movement of the valve element assembly is limited to be between stop parts 107 and 109.

Before going further with the description of the valving arrangement illustrated in Fig. 9 it may be noted that piston 103 and cylinder 104 have a cross-sectional area smaller than that of valve element 94 and also that end 103a of piston 103 is not subjected to the pressure of the actuating fluid flowing through the tool. When the hammer is moved downwardly so that valve element 94 is no longer within passage 93, the pressure of the actuating fluid in the conduit is free to act on the lower end of the valve element over an effective area equal to the cross-sectional area of piston 103 in opposition to the force exerted by pressure of fluid in cylinder 104; it being noted that there is thus provided an endwise area (end 103a) isolated from the actuating fluid so that the latter can always urge the valve element to retracted position. Since pressure interiorly of the tool is greater than the pressure exteriorly thereof, the valve element assembly will be moved upwardly to retracted position until stop parts 106 and 107 are in engagement. The valve element assembly will remain in this position as long as the flow of actuating fluid through the tool is great enough that the pressure in the supply conduit exceeds that exteriorly of the tool to provide the required differential to support the weight of the valve element assembly. As the flow of actuating fluid increases, the force urging the valve element to retracted position will likewise increase so that very high rates of flow do not tend to move the valve element from retracted position nor do they hinder its assuming such position but, on the contrary, assure that retraction of the valve element becomes even more positive as the flow increases.

When piston 90 is moved by the hammer into sufficient proximity with valve element 94 to restrict fluid flow therebetween, the pressure acting on the lower end of the valve element decreases, relative to the pressure upstream of the valve member, proportionally to the degree of restriction. When the resulting pressure differential across the valve element becomes great enough, the higher pressure upstream of the valve element will act on the upwardly disposed effective area thereof to overcome the pressure acting on the lower end of the valve element and it is aided in this by the pressure in cylinder 104. As a result, the valve element will be moved from retracted position into passage 93 until stop parts 108 and 109 are in engagement. It remains in this extended position until piston 90 and the hammer move downwardly sufficiently until the valve element no longer is within the passage. At such time the actuating fluid moves the valve element upwardly in the supply conduit to retracted position with stop parts 106 and 107 in engagement.

While a pressure differential is developed across valve element 94 to cause it to dive into passage 93, this does not sufficiently interfere with the flow of actuating fluid as to cause any perceptible water hammer. As the valve element dives into passage 93, flow through the tool is still not materially restricted due to the fact that the valve element assembly is moving at substantially the same velocity as the fluid and its movement increases the free volume of the supply conduit which can be occupied by the fluid. However, upon stop parts 108 and 109 coming into abutment, the flow of actuating fluid is restricted and a pressure differential of substantial magnitude will develop across piston 90 resulting in the application of a downward force stopping the hammer in its overtravel and then reversing its direction and moving it in its push-down stroke. It will be noted that during this interval, the valve element assembly remains stationary relative to the fluid supply conduit and that there is relative longitudinal movement between valve element 94 and piston 90.

In accordance with one feature of this invention, the flow of actuating fluid through passage 93 while valve element 94 is moving therethrough during the hammer's push-down stroke is modulated or varied in order to most effectively eliminate water hammer or to control the proportion of available force applied to the hammer at any specific instant. While such variation can be provided in a number of manners, there is illustrated in the drawings a variation which will result in a minimum restriction to fluid flow while the hammer is moving through its overtravel to its uppermost position and then downwardly a like distance and a maximum restriction upon the hammer moving downwardly through a substantial proportion of its push-down stroke. Thus, passage 93 can be divided into three portions, 93a, 93b and 93c. Portion 93a is made of largest cross-sectional area, while portion 93c is made of smaller area and can be only slightly larger than valve element 94. Intermediate portion 93b is tapered between portions 93a and 93c. With this type of modulation, valve element 94 will reside in the larger passage portion 93a while the hammer is overtraveling and while it moves downwardly a distance equal to its overtravel. While the hammer is overtraveling, piston 90 is moving upwardly to decrease the volume of the supply conduit thereabove and against the downwardly moving column of actuating liquid. It is during this movement that there is a tendency to develop the most severe water hammer and accordingly, valve element 94 is positioned in the larger passage portion 93a to permit a larger amount of liquid to be by-passed thereby effectively reducing or eliminating water hammer. As the hammer continues to move downwardly, valve element 94 enters tapered passage portion 93b whereby the by-pass flow of liquid is gradually decreased and the force on the hammer increased. Since the increase in pressure in the supply conduit is thus relatively gradual, water hammer does not develop. Upon the valve element entering passage portion 93c, a maximum restriction of by-pass liquid is developed and the downward force on the hammer likewise increased so that it is given a final "kick" before the valve element is unseated.

The lower valve means 16 is constructed similarly to the upper valve means 15 (Fig. 9) and hence corresponding parts for the lower valve means have been marked with the same numerals except that a prime has been added to designate they refer to the lower valve means. It may be noted, however, that valve element 94' is carried by the hammer and moves upwardly therewith while being withdrawn from passage 93'. The functioning of the lower valve means is the same as that of the upper valve means except that it should be noted that when faces 13 and 14 of the hammer and anvil are in abutment, a standoff distance "s o" is provided between valve element 94' and the entry 110 to passage 93'. In one form of the tool, the standoff distance, with faces 13 and 14 in abutment, is made sufficiently small as to restrict fluid flow therethrough in order that the actuating fluid flowing through the tool can move the valve element assembly downwardly upon the hammer striking the anvil. However, in a more preferred form of the tool, such restriction is substantially reduced or eliminated before the hammer strikes the anvil by adjusting the thickness of stop ring 111 so that the distance marked "s o" is increased sufficiently that when the hammer strikes the anvil, any restriction of fluid is insufficient to materially reduce the velocity of the hammer, just as described with respect to Figs. 1–1C and 4 above. In this manner, a shuttle distance is built into this valve means without causing the valve element to move beyond its normal retracted position, i.e. beyond where it is moved by a resilient means upon unseating from piston 90'. The momentum of the lower valve assembly, upon the hammer striking the anvil, will be great enough to cause it to move down and initially restrict flow through passage 93' so that the resulting fluid pressure differential across valve element 94' can move the valve element downwardly into passage 93' to a position similar to that illustrated in Fig. 9 for the upper valve element. When the tool is first positioned for operation with faces 13 and 14 in abutment, the lower valve element assembly will fall by gravity to its extended position so that upon starting the flow of actuating fluid to the tool, the hammer will immediaely begin moving in its push-up stroke.

The remaining construction of the tool of Figs. 9–9C is similar to that of Figs. 1–1C and it too is provided with a differential effective area, as described with respect to Figs. 1–1C, by making piston 90' larger than piston 90. However, in the tool of Figs. 9–9C, the difference in area between pistons 90' and 90 is always made larger than that of valve element 94' in order to move the hammer upwardly since the latter area is never available to push the hammer upwardly no matter how much momentum the hammer has.

In general, the operation of the tool of Figs. 9 to 9C is basically similar to that of the tool shown in Figs. 1–1C in that after the hammer strikes the anvil, the lower valve means 16 is closed by valve element 94' diving into passage 93' to restrict flow from the tool. At this time hammer 10 is not moving and hence the by-pass capacity of passage 93' is required to be relatively large to reduce or eliminate water hammer. Accordingly, passage portion 93a' is made sufficiently larger than valve element 94' to provide the necessary by-pass capacity. The resulting increase in pressure of the actuating fluid is then exerted upon the area equal to the difference between that of piston elements 90' and 90 less the effective area of valve element 94' to move the hammer upwardly. As the hammer so moves, valve element 94' remains in its downmost position with respect to the hammer with stop parts 108' and 109' in abutment. Hence the valve element moves upwardly with the hammer. As the hammer moves upwardly through its push-up stroke, valve element 94' moves upwardly along passage 93' to gradually increase the restriction of flow as it moves through passage portion 93b' and then to effect a maximum restriction while in passage portion 93c' to give the hammer a final upward "kick." In this manner, as in the upper valve means of Fig. 9, the fluid by-passed is decreased in volume as the velocity of the hammer is increased in its movement in a direction to provide increased space within the tool into which the actuating fluid can flow.

When valve element 94' has emerged from passage 93' so that it no longer restricts flow through the passage, the pressure of the actuating fluid acting on the under side of the valve element then causes it to move upwardly to the position shown in Fig. 9B.

At this time, the upper valve element 94 is in its uppermost position with stop parts 106 and 107 in abutment. As soon as the hammer coasts upwardly enough to position piston 90 sufficiently close to valve element 94 to restrict fluid flow therebetween, the resulting differential in pressure across the valve element will cause the valve element to dive downwardly into passage 93 and restrict flow therethrough. As soon as this happens, the actuating fluid begins to decelerate the upward movement of the hammer in its overtravel and then to move it downwardly through its push-down stroke. As the hammer so moves downwardly, valve element 94 remains fixed in position with respect to the fluid supply conduit and with the varying by-pass or restriction feature described above will increasingly restrict fluid flow through passage 93 as the hammer moves downwardly so as to give the hammer a maximum "kick" just before the valve element leaves passage 93. The hammer then moves downwardly to strike the anvil whereupon the lower valve element 94' enters passage 93' to repeat the cycle.

As mentioned above, increasing the rate of flow of actuating fluid through the tool of Figs. 9–9C does not adversely affect the valve elements 94 and 94' while in their retracted positions and, in fact, increasing the flow increases the force exerted on these valve elements tending to hold them in their uppermost position. Further, with the variable size passages 93 and 93', the flow restriction between valve element 94 or 94' and passage 93 or 93' when the valve elements are in their lowermost or extended position can be made small enough until only sufficient restriction remains to hold the valve element in its extended position at the contemplated minimum flow rate. Then as the flow rate is increased, the pressure differential across the valve elements increases thereby even more positively holding them in their extended positions. On the other hand, the increasing differential with increasing flow permits a correspondingly greater absolute quantity of fluid to be by-passed so that the risk of water hammer occurring does not materially increase with such increased rate of flow of actuating fluid. This does not, however, reduce the maximum ultimate hammer velocity because passages 93 and 93' can be shaped so that the fluid restriction becomes very large or even absolute before the respective valve element leaves the passages.

Referring to Fig. 12, there is shown an upper valve means 15' which can be substituted for any of the previously described valve means 15 under circumstances where a push-down of the hammer stroke equal to its overtravel will sufficiently accelerate the hammer to deliver the desired blow to the anvil. In this construction, a piston element 112 is carried by the hammer and has a passage 113 therethrough. This passage can be of uniform diameter, as illustrated, where the varying fluid restriction effect is not desired or it can be formed to provide such effect as, for example, in the manner of piston 90 in Fig. 9. A fingerlike valve element 114 is fixedly mounted in the fluid supply conduit as, for example, by wedging a tapered head 115 of the valve element in a correspondingly tapered bore 116 in section 11c of the supply conduit. With this construction, the hammer moves upwardly after the lower valve means 16 has opened until valve element 114 is caused to enter passage 113 to restrict flow therethrough. From the point of initial restriction until the hammer reaches its uppermost position is, of course, the overtravel of the hammer and since valve element 114 is fixed relative to the supply conduit, the hammer will have actuating fluid applied to piston 112 to urge the hammer in its power stroke only while the valve element 114 is in passage 113 and hence the push-down stroke will be equal to the overtravel.

It is contemplated that either or both of passages 93 and 93' of Figs. 9–9C can be made as a uniform bore as shown for passages 113 in Fig. 12. Further, passages 93 or 93', or both, can be a mere orifice of substantially no axial depth and yet the variable restriction effect described above can be achieved by varying the cross-section of valve elements 94—94' and their respective stems 100—100' so that, for example, they have a minimum cross-section situated at the orifice immediately after the valve elements dive through the orifice and have a maximum cross-section at their lower end to afford a maximum restriction after the valve elements have had a substantial portion of their length move past the orifice during the push-down and push-up strokes.

In accordance with another feature of this invention, it is possible to control the beating frequency of the hammer by one of various means which regulate the distance between the supply conduit and anvil to be such as to give the desired hammer beating frequency. Before turning to a description of these various control means and methods, it should be pointed out that the hammer, after the lower valve means has been opened, will coast upwardly in its return stroke until the upper valve means restricts flow from the supply conduit. By moving the supply conduit away from the anvil, the hammer must coast a greater distance after the lower valve means is opened and before the upper valve means is closed. It also then moves a greater distance in its power stroke after the upper valve means has opened and before the hammer strikes the anvil. Since the movement through this greater distance involves a period of time dependent upon the distance, it will be apparent that as the distance between the supply conduit (or the upper valve element) and the anvil increases, the frequency of the hammer will decrease. In fact, the supply conduit can be moved upwardly sufficiently that the hammer's upward movement never causes the upper valve means to close. The hammer's downward velocity in its power stroke is thus dependent primarily upon gravity. The tool is then said to "single act."

On the other hand, as the distance between the supply conduit or upper valve element and the anvil decreases, the frequency of the hammer will increase since the upper valve means will close more quickly after the lower valve means has opened and therefore the hammer will not coast as far after the lower valve means opens and before the upper one closes. Accordingly, reducing the distance between the fluid supply conduit or upper valve element and the anvil increases the beating frequency of the hammer. Therefore, by controlling the spacing between the supply conduit and anvil, the beating frequency of the hammer can be controlled.

In Fig. 13, one means for controlling the beating frequency is illustrated. Thus there is provided a tool including a hammer 10 adapted to reciprocate between a fluid supply conduit 11 and an anvil 12 and provided with upper and lower valve means 15 and 16 acting in a manner described above to move the hammer in its power and return strokes. The fluid supply conduit is extended to provide a reduced diameter portion 120 terminating in a piston 121 slidably received in a cylinder 122 in the lower end of drill string 123. A ball and spline joint 124 is provided between the drill string and the supply conduit in a similar manner as between the hammer and supply conduit and anvil as described above to thereby permit the supply conduit to move longitudinally but not rotationally with respect to the drill string. The piston comprising valve means 15 is made of larger cross-sectional area than piston 121 so that there exists a differential of area therebetween against which fluid pressure within the supply conduit can act to urge the supply conduit upwardly. Since the pressure in the supply conduit will at all times exceed that exteriorly thereof the interior pressure exerts a net force over the above-mentioned differential area tending to move the supply conduit upwardly. This upward force tends to contract the telescoping joint between the supply conduit and the drill string. Further, the net upward force or reaction will be dependent upon whether or not the upper or lower valve means are closed since closing of either of these restricts flow through the tool and thereby increases the pressure in the supply conduit. As a result, the actuating fluid pressure applied to the differential of area between the piston of valve means 15 and piston 121 will fluctuate from a minimum with both valve means 15 and 16 open to a maximum existing when the upper valve means is closed and the hammer is moving upwardly in its overtravel thereby tending to compress the fluid immediately thereabove and increase its pressure. Since the hammer may have a beating frequency of 200 to 700 cycles per minute or greater, the fluctuations in pressure in the supply conduit are very rapid so that there exists, for all practical purposes, a substantially constant upward reaction on the supply conduit. This upward reaction will support a predetermined weight of the supply conduit and cause it to "float" in the bore hole above the hammer. By preselecting this weight to be of a predetermined value, the point at which the supply conduit floats in the bore hole relative to the anvil can be made to be substantially constant. Thus, if the supply conduit moves downwardly toward the anvil, the hammer frequency increases which increases the upward reaction on the supply conduit causing its descent to slow or even be reversed. On the other hand, if the supply conduit moves upwardly away from the anvil, the hammer frequency decreases thereby decreasing the net upward reaction on the supply conduit permitting it to move downwardly. At some point dependent upon the weight of the supply conduit, the net upward reaction will balance the weight of the supply conduit and maintain it a fixed distance above anvil 12. As shown in Fig. 13, the weight of the supply conduit can be varied by connecting one or more drill collars 125 thereto to increase or decrease its weight.

In accordance with another feature of this invention, surface controls can be provided for maintaining the distance between the supply conduit or upper valve element and the anvil substantially constant and thereby maintain a desired beating frequency of the hammer. Thus referring to Fig. 14, there is illustrated a bore hole 130 in which is disposed a tool 131 of the type wherein the distance between a supply conduit 132 and anvil 133 governs the frequency of beating of hammer 134. The tool is, of course, connected to a drill string 135 which passes via a Kelly joint 136 through a rotary table 137 to be suspended from a swivel 138. The swivel is in the usual fashion carried by a traveling block 139 which is cabled to a crown block 140 situated in a mast 141. The usual drilling mud connection 142 is provided from mud pump 143 which in the normal manner takes suction from a mud pit (not shown). A draw works illustrated schematically at 144 feeds cable 145 to control the rate of feed of drill string 135 into the bore hole.

Means are provided for controlling the rate at which the feeding means (draw works) feeds drill string into the bore hole. Such control means is responsive to the mud pump discharge pressure and hence to the pressure applied to tool 131. The control means is arranged so that upon a drop of mud pressure below a predetermined valve, the feeding means is permitted to feed the drill string into the hole at a more rapid rate in order that supply conduit 132 can be lowered relative to anvil 133 thereby increasing the frequency of the hammer and causing the mud pump pressure to again rise. When the mud pump pressure rises above such predetermined value, the feeding means is slowed down in order to decrease the frequency of the hammer and cause the mud pressure to resume the predetermined value. Thus in Fig. 15, there is shown the draw works 144 of Fig. 14 which is provided with a cable drum 146 and a brake or other means controlling the rate of rotation of drum 146. In the drawings, a hand brake is illustrated schematically at 147 and is connected by rod 148 to a piston 149 disposed in a cylinder 150. The mud pump discharge pressure is applied through pipe 151 to a side of piston 149 such that upon increase in the pump pressure, brake 147 will be applied to slow down or stop drum 146. A counterbalancing resilient means is provided to urge the piston in an opposite direction and in the drawings this is illustrated as including an air line 152 having a pressure regulator 153 disposed therein so that any preselected pressure can be applied to and maintained on the underside of piston 149. With this construction, regulator 153 can be adjusted until the force of the air below piston 149 adjusts the latter's position against the counter force of the mud pump discharge pressure so that the drum 146 turns at a rate to feed the drill string in the hole such that the distance between the supply conduit and the anvil of the drilling tool will be maintained such as to give a predetermined beating frequency to the hammer. At such frequency, the mud pump discharge pressure will likewise have a predetermined value. When the discharge pressure increases above this value, piston 149 will move downwardly to cause brake 147 to slow down drum 146 so that the bit can be drilled away from the supply conduit to increase the distance between the supply conduit and the anvil so that the hammer again assumes its predetermined beating frequency. Should the mud pump pressure fall below its predetermined value, due to too slow feeding of the drill pipe into the bore hole, piston 149 will move upwardly to partially release brake 147 from drum 146 and permit the drill string to be fed more rapidly into the hole until the mud pump pressure returns to its predetermined value.

In order to prevent cable drum 146 from being released to drop the drill string into the hole should the mud pump pressure fall to an obnormally low value or even fail, means are provided for restraining drum 146 responsive to a drop in mud pressure below a predetermined value. Thus, the drum is connected to a positive displacement pump 154, as via chain 155, to pump a liquid from reservoir 156 through pipe 157 into pipe 158 and then back to the reservoir as drum 146 of the draw works rotates to feed drill string into the hole. If desired, a step-up gear mechanism can be provided between the drum and pump 154 in order to increase the speed of the pump relative to that of the drum. The fluid discharged into pipe 158 flows through a hand controlled valve (e.g. needle valve) 159 and a mud actuated control valve 160. Control valve 160 includes a seat 161 and a valve member 162 adapted to seat therein to block flow through the valve. A spring 163 is provided to urge valve member 162 toward seated position. Opposing this action of spring 163 is the force of the mud pump discharge pressure which is applied through a pipe 164 to the underside of piston 165 so that this piston which resides in a cylinder 166 urges valve member 162 to unseated position. With this construction, should the mud pump discharge pressure fall below a predetermined value, valve member 162 will seat under the influence of spring 163 so that fluid can no longer flow through pump 154. Since pump 154 is of the positive displacement type, it can no longer be rotated and will act as an effective brake upon drum 146 preventing its rotation until the mud pump pressure increases enough to open valve 160. Hand valve 159 can be employed to limit the maximum flow rate through pipe 158 and hence the maximum speed of rotation of drum 146.

In Fig. 17 as illustrated an electrical means for accomplishing the same purpose as the hydraulic means of Figs. 15 and 16. Thus there is provided a dynamometer 170 directly connected or geared to the drum shaft. The field coils of the dynamometer are connected to a source of current S having in series therewith a variable resistance 171. This variable resistance can comprise a coil 172 having one end connected to the field circuit and a slide wire 173 also connected in the field circuit and movable along coil 172 to vary the resistance in the field circuit. Slide wire 173 is also connected as by rod 174 to a piston 175 having a resilient means such as spring 176, urging the piston in a direction as to move slide wire 173 to increase the resistance in the field circuit. The opposite side of the piston is exposed via pipe 177 to the mud pump discharge pressure so that as this pressure increases, the resistant 171 decreases permitting more current to flow through the field coils of the dynamometer to permit the drum to more rapidly feed the drill string into the bore hole. As the pump pressure decreases from a predetermined value, the effective resistance of 171 is increased and the dynamometer slows down the drum to decrease the rate of drill string feed.

In Fig. 18 is shown another hydraulic control system for controlling the feed rate of the drill string as described with reference to Figs. 15 and 16. In this system, a positive displacement pump 180 is connected by suitable means, such as chain 181 to a sprocket 182 carried on the shaft of drum 146. If desired, suitable speed increasing means can be provided between the shaft of the drum and pump 180 so that the latter rotates at a higher speed than the drum. Pump 180 pumps fluid from reservoir 183 via pipes 184 and 185 to a control valve 186. This control valve has a valve member 187 adapted to throttle flow of fluid therethrough and closely control the rate of flow. The valve member is biased as by spring 188 toward open position and the force of the biasing means is opposed by the mud pump discharge pressure applied through pipe 189 to piston 190 in cylinder 191. It will be apparent that as the mud pump discharge pressure in pipe 189 increases, valve member 187 will move closer to closed position and thereby decrease the rate of flow through pipe 185, which in turn slows down the speed of pump 180 thereby braking or slowing down drum 151. When the mud pump pressure decreases, the action is just the opposite so that pump 180 can speed up under the force applied thereto by drum 151.

Means are provided for stopping pump 180 should the mud pumps fail or for any other reason, the discharge pressure dropped below normal. Such means can comprise a spring loaded check valve 192 having a valve element 193 urged toward seated position by spring 194. Opposing the action of this spring is the pressure of the mud pump discharge exerted through pipe 195 to the underside of piston 196. As soon as the mud pressure drops below a predetermined value necessary to overcome the force of spring 194, valve 192 will close thereby stopping flow through pump 180 and causing it to prevent drum 146 from turning to drop the drill string in the bore hole.

Instead of using the pressure of the fluid flowing to the impact tool as a variable with which to control the rate of drill string feedoff, it is possible to use the bottom-hole weight of the drill string and supply conduit as the control variable. As pointed out above, reciprocation of the hammer results in an upward reaction on the supply conduit. For any given hammer beating frequency, such upward reaction can support a proportion of the weight of the drill string. Therefore, if the remainder of the weight of the drill string is supported by means other than the upward reaction of the impact tool, such as by the rig at the surface of the earth, the beating frequency of the hammer will be maintained at a predetermined value. Conventional means are available in the prior art for maintaining a substantially constant bottom-hole weight on a bit of a conventional rotary drilling string. One of such means is illustrated schematically at 200 in Fig. 19 as being connected to a brake 201 which regulates the speed of drum 146. Transmission of torque from drum 146 to control 200 can be by chain 202 so that control 200 can regulate brake 201 in accordance with the tension existing in cable 145. The arrangement is such that as tension in cable 145 increases and therefor less weight is supported by the upward reaction of the drilling tool, brake 201 is released to decrease the tension in the cable and thereby increase the beating frequency of the hammer. On the other hand, should tension in cable 145 fall below a predetermined value, brake 201 is applied by control 200 to slow down drum 146 thereby increasing the tension in cable 145. With such control, the cable tension of 145 can be maintained substantially constant so that the beating frequency of the hammer can be maintained at a predetermine value.

In the past, a great deal of difficulty has been encountered in maintaining a threaded nut, such as nuts 45, 57 and 57a, in place on a valve element or member during the operation of the tool. The nuts referred to above are subjected to a high frequency motion and abrupt acceleration and deceleration from at-rest positions. Also, the force of the respective springs bearing on the nuts tends to cause them to be dislodged from the valve elements. Many different types of arrangements, including elastic stop nuts, lock nuts and washers, et cetera, have been tried but have failed for one reason or another. The special construction shown in Figs. 1, 1B or 4 have been found to be satisfactory in that they maintain the nut fixed in position during even extended periods of operation of the tool under the adverse conditions encountered in a bore hole in the earth.

Referring to Fig. 1, the upper end of valve element 34 and the inside of nut 45 are both provided with a thread 205 which preferably is tapered, as for example, three-fourths inch per foot. The upper end of the valve element is longitudinally slotted to provide a plurality of upstanding portions 206 adapted to be flexed radially outwardly at their upper ends by tapered pin 71. The upper end of valve element 34 is provided with an internal bore 207 adapted to receive tapered pin 71 and the portion of this bore internally adjacent and at the upstanding castellations can be either of the same taper as pin 71 or substantially the same. In either event, nut 45 can be screwed into position at the upper end of valve element 34 and then pin 71 driven into place to spread castellations 206 slightly outwardly so that there will be a high contact force (e.g. galling contact) between both top and bottom flanks of the threads thus preveinging even the slightest axial movement of the nut. The force between the flanks of adjacent threads will be sufficiently high so that any rotation of the nut will cause galling and thus prevent further rotation and consequent backing off of the nut from the valve element. The force between the threads can be released by removing pin 71 so that nut 45 can then be removed. It is preferred that the taper of pin 71 and that of the internal bore of the valve element in contact therewith be such as to provide a sticking taper between the pin and valve element. In this connection, it is to be noted that pin 71 has a passage 70 therethrough and that the pin can be replaced with others having different size passages 70 in order to easily change the by-pass flow across the upper valve means. In this manner, pin 71 can be made to serve a double function.

In Fig. 1B, the arrangement for locking nut 57 in place is very similar to that of Fig. 1 except that pin 71a does not have a passage therethrough and is provided with an O-ring 208 adapted to form a fluid tight seal between the pin and the walls of bore 207. Since bore 207 is closed at its lower end by an imperforate section 209, pressure exteriorly of the bore will tend to urge pin 71a downwardly into the bore. Since the pin-valve element assembly is usually assembled at the surface of the earth, the pressure in bore 207 below O-ring 208 will normally be atmospheric. The pressure in the tool during operation may amount to several hundreds of pounds so that the resulting differential of pressure across pin 71a can be quite substantial and exert a material force tending to hold the pin in place.

A somewhat different type of lock nut assembly is illustrated in Fig. 4 wherein upstanding portions or castellations 205 are provided with inner and outer surfaces 210 and 211 each of which are substantially parallel to the longitudinal axis of the nut and valve element. Surface 212 on nut 57a is tapered inwardly in the direction of threads 205 and pin 213 is provided with a surface 214 tapered parallel to surface 212. Portions 206 are also provided with a relief groove 206a facilitating radially outward flexing of portions 206. Threads 205 begin on valve element 55a at a point below the castellations 206 and similarly a lower portion of nut 57a is correspondingly threaded. The tapered outer surface 214 of pin 213, when the latter is properly positioned, moves castellations 206 outwardly until surfaces 211 and 212 of the castellations and nut 57a are in tight engagement, thereby preventing nut 57a from backing off. It will be apparent that if the nut does tend to back off, it will stick against the taper (surface 211) provided by flexing castellations 206 outwardly. Pin 213 can be threaded as at 215 into bore 216 of valve element 55a thereby holding the pin in place. Here again, an O-ring 217 can be provided to seal bore 216 so that a pressure differential can act across pin 213 to urge it into and maintain it in its desired position.

From the foregoing it will be seen that this invention is one well adapted to attain all of the ends and objects hereinabove set forth, together with other advantages which are obvious and which are inherent to the apparatus.

It will be understood that certain features and sub-combinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a fluid actuated impact tool wherein an anvil and a relatively reciprocable hammer are provided relatively positioned so that the hammer will strike the anvil on reciprocating movement in one direction, the tool having a passageway therethrough for flow of an actuating fluid, said hammer having a fluid pressure actuatable area facing toward the direction of movement of the hammer to strike the anvil and exposed to the pressure of an actuating fluid flowing in said passageway to be urged thereby away from the position in which it strikes the anvil, and wherein means are provided to alternately restrict and release the flow of such fluid downstream from said area to respectively increase and decrease the pressure of such fluid acting on said area to move the hammer away from striking engagement with said anvil and permit it to move toward striking engagement with said anvil, the improvement which comprises improved means for alternately so restricting and releasing such flow comprising first and second valve members located in said passageway and arranged to seat together to so restrict flow through the tool, said first valve member being carried by the anvil, means slidably mounting the second valve member on the hammer to permit the second valve member to remain seated with the first valve member during at least a portion of the return stroke of the hammer and then unseating the second valve member, said mounting means including a shuttle connection between the second valve member and the hammer permitting the second valve member to move relative to the hammer to a first position before the hammer completes its power stroke and then to a second position upon the hammer striking the anvil, the second valve member when in said first position and with the hammer in anvil striking position being spaced from the first valve member sufficiently that any restriction of fluid flow therebetween is insufficient to materially reduce the velocity of the hammer before it strikes the anvil and upon movement of the second valve member to said second position, such spacing is decreased sufficiently that fluid flow is restricted so as to urge the second valve member toward and maintain it seated with the first valve member until unseated by said mounting means.

2. The tool of claim 1 wherein said mounting means includes means moving the second valve member to said second position upon its unseating from said first valve member.

3. The tool of claim 1 wherein said mounting means includes a part slidably supporting said second valve member and wherein said shuttle connection is provided by slidably mounting said part in said hammer to move between said first and second positions.

4. The tool of claim 1 wherein said mounting means includes a part carried by the hammer, a spring between such part and said second valve member urging the latter away from said first valve member and wherein said shuttle connection is provided by slidably mounting said part, spring and second valve member for movement as a unit between said first and second positions with respect to the hammer.

5. The tool of claim 1 wherein said mounting means includes a valve supporting part carried by the hammer, an intermediate member slidably mounted on the part for movement between said first and second positions and slidably carrying the second valve member, and resilient means between the intermediate member and the second valve member urging the latter away from the first valve member.

6. The tool of claim 1 wherein said mounting means and shuttle connection includes a spring moving the second valve member away from the first valve member upon unseating of the same to said second position, said valve member being free to move from said second to said first position.

7. The tool of claim 1 in which parts of the tool have a restricted passageway therethrough disposed to by-pass fluid around said first and second valve members when the same are seated against each other.

8. A fluid actuated impact tool which comprises, in combination, a fluid supply conduit, an anvil, a reciprocable hammer having a sliding connection with said anvil and a sliding connection with said conduit and providing a fluid passageway communicating between the conduit and the exterior of the tool, said hammer and anvil having opposed impact surfaces adapted to strike together at one extremity of the relative sliding movements between said hammer and anvil, said hammer also having a fluid pressure actuatable area disposed so that fluid in said passageway can act thereagainst to urge the hammer in a direction to move said impact surfaces apart, and valve means for controlling flow of fluid out of said passageway to the exterior of the tool comprising a first valve member carried by the anvil and a second valve member seatable therewith, means mounting said second valve member on the hammer for limited sliding movement relative thereto so as to permit said second valve member to remain seated while the hammer is moving through a portion of its return stroke from abutment with the anvil and then causing said second valve member to be unseated and moved away from the first valve member to a retracted position, said second valve member when in said retracted position and with the hammer abutting the anvil being situated close enough to the first valve member that fluid flow therebetween is restricted sufficiently that said fluid exerts sufficient pressure on the second valve member to move it to seated position, said mounting means also including shuttle means permitting the second valve member to move relative to the hammer and before the hammer strikes the anvil from said retracted position to a position more remote from said first valve member, the distance between said retracted and said remote positions being sufficient that with the hammer in anvil striking position and the second valve member in said remote position, the second valve member is positioned far enough from the first valve member that flow of fluid is substantially unrestricted whereby said hammer can deliver a blow to the anvil while the second valve member is in said remote position so that fluid pressure on said area is not substantially increased before the hammer strikes the anvil and then the hammer is moved in its return stroke upon movement of the second valve member from said remote position to said retracted position so that it is seated to increase said pressure on said area.

9. A fluid actuated impact tool which comprises, in combination, a fluid supply conduit; an anvil; a hammer mounted for reciprocation between the conduit and anvil and in such reciprocation movable to and from impact engagement with the anvil, said hammer providing a fluid pressure actuatable area thereon disposed so that pressure of an actuating fluid flowing from said conduit can act thereagainst to urge the hammer away from its impact engagement with the anvil; a passageway providing communication between the conduit, said area and the exterior of the tool; means for alternately restricting and releasing flow through the passageway at a point between said area and the exterior of the tool including first and second valve members arranged to seat together to so restrict the flow, said first valve member being carried by the anvil, means slidably mounting the second valve member on the hammer to permit the second valve member to remain seated with the first valve member during at least a portion of the return stroke of the hammer and then unseating the second valve member, said mounting means including a shuttle connection permitting the second valve member to move relative to the hammer to a first position before the hammer completes its power stroke and then to a second position upon the hammer striking the anvil, the second valve member when in said first position and with the hammer in anvil striking position being spaced from the first valve member sufficiently that any restriction of fluid flow therebetween is sufficient to materially reduce the velocity of the hammer before it strikes the anvil and upon movement of the second valve member to said second position, such spacing is decreased sufficiently that fluid flow is restricted so as to urge the second valve member toward and maintain it seated with the first valve member until unseated by the mounting means; and motor means for driving the hammer in its power stroke including first and second valve elements seatable together to form a piston slidable in said fluid conduit, the first element being carried by the hammer, means slidably mounting the second element on the conduit to permit it to remain seated with the first element during a portion of the power stroke of the hammer and then unseating it, the second element when unseated being positioned to be seated with the first element only after the second valve member has been unseated from the first valve member.

10. A fluid impact tool which comprises, in combination, a fluid supply conduit; an anvil; a hammer telescoping with the conduit and anvil for reciprocation therebetween and in such reciprocation movable to and from impact engagement with said anvil and having a fluid pressure actuatable area disposed for fluid pressure to act thereagainst to urge the hammer away from impact engagement with the anvil; a fluid passageway through the hammer communicating with the conduit, said area and the exterior of the tool; and first and second valve members seatable together to form a piston slidable in a portion of the passageway in the hammer downstream of said area, said first valve member being carried by the anvil and the second valve member being slidably mounted on the hammer to permit it to remain seated with the first valve member while the hammer is moving through a portion of its return stroke, means for unseating the second valve member and then moving it away from the first valve member to a retracted position when the hammer has moved through said return stroke portion, means providing a shuttle connection between the second valve member and hammer permitting the valve member to move from said retracted position to a position more remote from the first valve member before the hammer strikes the anvil and then, upon the hammer striking the anvil, permitting the second valve member to move back to its retracted position so that it can seat with the first valve member.

11. The tool of claim 10 wherein said first valve member comprises a piston element slidable in said passageway portion and having a passage therethrough forming a part of said passageway and wherein the second valve member comprises a poppet type valve element seatable with said piston element to restrict flow through said passage.

12. The tool of claim 11 wherein said valve element is mounted on the hammer by a valve cage having a slidable connection with said valve element, said shuttle connection being provided by slidably mounting said cage on the hammer for movement with the valve element between said retracted and remote positions.

13. The tool of claim 11 wherein said valve element is mounted on the hammer by a valve cage carried by the hammer and an intermediate member slidably carrying the valve element and itself being slidably carried by said cage for limited movement relative thereto and wherein said means for unseating and moving the valve element includes stop parts carried by the valve element and intermediate member limiting sliding movement therebetween while the valve element is seated with the piston element and resilient means between the valve element and intermediate member urging the valve element away from the piston member.

14. The tool of claim 11 wherein said means for unseating and moving said valve element includes a spring engaging the valve element and urging it to but not beyond said retracted position and wherein said shuttle connection includes mutually engageable stop parts respectively carried by the valve element and hammer and becoming engaged upon movement of said valve element from said retracted position to said remote position.

15. A fluid actuated impact tool which comprises, in combination, a fluid supply conduit, an anvil, a hammer mounted for reciprocation relative to said conduit and anvil and in such reciprocation movable to and from impact engagement with the anvil and provided with a fluid pressure actuatable area disposed for fluid from the conduit to act against to urge the hammer away from impact engagement with the anvil, a passageway in the hammer communicating between said area and the exterior of the tool, first and second valve members seatable together to form a piston slidable in said passageway restricting flow of fluid to the exterior of the tool to thereby increase the pressure of fluid acting on said area, means responsive to movement of the hammer away from the impact engagement with the anvil for unseating said valve members and to permit seating of the same upon movement of the hammer toward impact engagement with the anvil, a restricted by-pass passage around said valve members when seated, a fluid motor for moving the hammer toward the anvil and means for rendering said motor operable when said valve members are unseated and inoperable when said valve members are seated.

16. The tool of claim 15 wherein said motor includes two valve elements seatable together to form a piston slidable in said conduit and blocking flow therefrom, one of the two valve elements being carried by the hammer, a restricted by-pass passage around said two valve elements when seated and means for unseating the two valve elements after the hammer has moved a predetermined distance toward the anvil.

17. A fluid actuated impact tool which comprises, in combination, a fluid supply conduit; an anvil; a reciprocable hammer slidingly connected to said anvil and conduit and movable to and from impact engagement with said anvil; said conduit, anvil and hammer having interconnected fluid passageways therein; first valve means for limiting flow from the hammer into the anvil and comprising two valve members seatable together to form a piston slidable in said hammer passageway with one of such valve members carried by the anvil; means for unseating the valve members upon movement of the hammer a finite distance away from impact engagement with the anvil; second valve means for limiting flow from the conduit into the hammer comprising two valve elements seatable together to form a piston slidable in said conduit with at least one of the valve elements carried by the hammer, means for unseating the valve elements upon movement of the hammer a finite distance toward impact engagement with the anvil; the piston formed by the first valve means having a larger cross-sectional area than that formed by the second valve means; and a passage communicating from a point upstream of the second valve means to a point downstream thereof, said passage being of a size relative to the size of the conduit so as to permit sufficient fluid to flow therefrom to substantially reduce water hammer upon seating of the second valve means and yet being small enough that a substantial pressure differential is maintained across the second valve means when closed to accelerate the hammer in its movement toward impact engagement with the anvil.

18. The tool of claim 17 wherein a restricted passage is provided to communicate from a point upstream of the first valve means to a point downstream thereof when the first valve means is closed.

19. The tool of claim 18 wherein said passage communicating upstream of the second valve means is larger than the passage communicating upstream of the first valve means so that with both valve means seated at the same time, fluid from the conduit can enter the hammer passageway at a rate greater than it leaves such passageway thereby causing the hammer to move in its return stroke.

20. The tool of claim 18 wherein at least one of said passages is provided by an opening through a plug, said plug being situated in a bore through one of the elements of the first and second valve means as the case may be whereby the size of the passage can be readily changed by interchanging said plug with another having a different sized opening therein.

21. A fluid actuated impact tool which comprises, in combination: a fluid supply conduit; an anvil; a hammer mounted for reciprocation relative to the conduit and anvil and in such reciprocation movable to and from impact engagement with the anvil; interconnected fluid passageways in the conduit, hammer and anvil; a piston slidable in the hammer passageway and carried by the anvil, said piston having a passage therethrough forming a part of the anvil passageway; an elongate valve member insertable into said piston passage; and means mounting the valve member on the hammer to position said member within said piston passage to restrict flow therethrough during at least a portion of the return stroke of the hammer and then moving the valve member out of said piston passage; said hammer having a fluid pressure actuatable area disposed upstream of said piston and exposed to fluid from the conduit so that upon restriction of flow through the piston passage by movement of the valve member thereinto, fluid from the conduit acts on said area to move the hammer away from impact engagement with the anvil.

22. The tool of claim 21 wherein said mounting means mounts the valve member for a limited sliding movement relative to the hammer and wherein means are provided for moving the valve member away from the piston upon its movement out of the piston passage to a position such that upon movement of the hammer to anvil striking position, the valve member restricts flow through the piston passage sufficiently that fluid pressure in the hammer passage causes the valve member to dive into said piston passage.

23. The tool of claim 21 wherein the cross-sectional area of the valve member is less than that of the piston passage to permit limited flow of fluid through the piston passage when the valve member is positioned therein to thereby reduce water hammer when the valve member moves into the piston passage to restrict flow therethrough.

24. The tool of claim 23 wherein the cross-sectional areas of the valve member and the piston passage are proportioned relative to each other such that the restriction of flow through the passage becomes greater as the valve member moves from a position where it extends furthest into the piston passage to a position of less extension into the piston passage.

25. In a fluid actuated impact tool wherein an anvil and a relatively reciprocable hammer are provided relatively positioned so that the hammer will strike the anvil on reciprocating movement in one direction, the tool having a passageway therethrough for flow of an actuating fluid, said hammer having a fluid pressure actuatable area facing toward the direction of movement of said hammer to strike the anvil and exposed to the pressure of an actuating fluid flowing in said passageway to be urged thereby away from the position in which it strikes the anvil, and wherein means are provided to alternately restrict and release the flow of such fluid downstream from said area to respectively increase and decrease the pressure of such fluid acting on said area to move the hammer away from striking engagement with said anvil and permit it to move toward striking engagement with said anvil, the improvement which comprises improved means for so alternately restricting and releasing such flow comprising a first valve member in said passageway having a passage therethrough for the fluid flowing through the tool, a second and elongate valve member in said passageway insertable into said passage to restrict flow therethrough, means mounting one valve member on the anvil and the other on the hammer, the means mounting the elongate valve member providing a slidable connection between the elongate valve member and the one of the anvil and hammer upon which it is mounted and including means biasing the elongate valve member to a retracted position relative to the first valve member such that upon movement of the hammer toward anvil striking position, the elongate member is positioned in sufficient proximity to said passage to restrict flow therethrough sufficient to overcome said biasing means and cause the elongate member to dive into said passage, and stop means limiting movement of the elongate member into said passage so that as the hammer moves in its return stroke, the elongate member is withdrawn from said passage.

26. The tool of claim 25 wherein said passage is sufficiently larger in cross-section than said elongate valve member to permit limited flow of fluid through said passage when the elongate valve member is positioned therein to thereby reduce water hammer when said elongate member dives into said passage to restrict flow therethrough.

27. The tool of claim 26 in combination with fluid motor means between the conduit and hammer for driving the hammer in its power stroke.

28. In a fluid actuated impact tool wherein an anvil and a relatively reciprocable hammer are provided relatively positioned so that the hammer will strike the anvil on reciprocating movement in one direction, the tool having a passageway therethrough for flow of an actuated fluid, said hammer having a fluid pressure actuatable area facing toward the direction of movement of said hammer to strike the anvil and exposed to the pressure of an actuating fluid flowing in said passageway to be urged thereby away from the position in which it strikes the anvil, and wherein means are provided to alternately restrict and release the flow of such fluid downstream from said area to respectively increase and decrease the pressure of such fluid on said area to move the hammer away from striking engagement with said anvil and to permit it to move toward striking engagement with said anvil, the improvement which comprises improved means for alternately so restricting and releasing such flow comprising a first valve member in said passageway carried by the anvil and having a passage therethrough for the fluid flowing through the tool, a second valve member in said passageway of a size as to be movable into said passage to restrict flow therethrough, means mounting the second valve member on said hammer for limited movement relative to the hammer between first and second positions, means biasing the second valve member toward said second position, said second valve member having a fluid pressure actuatable area disposed so that fluid upstream of said passage urges the second valve member toward said first valve member, said second valve member when in its second position and with the hammer having moved through at least a portion of its power stroke being in sufficient proximity to said passage to restrict flow therethrough so that fluid pressure upstream of the passage acts on said area of the second valve member to cause it to dive into said passage and assume its first position.

29. The tool of claim 28 in combination with a passageway for by-passing fluid around said valve members when the second valve member is positioned within the passage in said first valve member, the flow capacity of said passageway being small enough that there results an increase in fluid pressure acting upon said hammer area with the second valve member within the first and yet large enough to substantially decrease water hammer when the second valve member dives into said passage to restrict flow therethrough.

30. The tool of claim 29 wherein said second valve member is of a cross-sectional area sufficiently smaller than that of said passage to provide said passageway.

31. The tool of claim 30 wherein the cross-sectional area of said passage varies along its length to thereby vary the pressure of fluid acting on said hammer area as the hammer moves in its return stroke.

32. The tool of claim 28 wherein said biasing means comprises a cylinder carried by the hammer, a piston in the cylinder having one end exposed to pressure exterior of the tool, a connection between said piston and second valve member such that movement of the latter to its second position moves the piston in a direction opposite that in which it is urged by said exterior pressure, said second valve member providing a fluid pressure actuatable area against which pressure within the tool acts to urge said piston in said opposite direction, the last mentioned area being disposed as to be positioned in said passage when the second valve member moves thereinto.

33. In a fluid actuated impact tool wherein a hammer is moved in a direction away from impact engagement with another element of the tool responsive to restriction of fluid flow, in combination therewith the improved means for so restricting said flow comprising a first valve member having a passage therethrough for such fluid flow, a second valve member of a size as to be movable into said passage and restrict flow therethrough, one of said valve members being mounted on the hammer and the other on said tool element, means providing a limited sliding connection between one of said valve members and the one of the hammer and tool element upon which it is mounted, the valve members having such connection being provided with a fluid pressure actuatable area against which pressure upstream of said passage can act to urge it toward the other valve member, and means biasing the valve members apart, said area being of sufficient size to overcome said biasing means upon movement of the hammer into sufficient proximity with said tool part to cause said second valve member to restrict flow through said passage and thereby increase the upstream pressure on said area.

34. The tool of claim 33 wherein the parts of the tool have a passageway therethrough communicating between a point upstream of said passage and a point downstream thereof, the flow capacity of said passageway being small enough that there results an increase in pressure of fluid upstream of the passage upon movement of the second valve member into said passage and yet large enough to substantially decrease water hammer when the second valve member moves into said second passage and restricts flow therethrough.

35. The tool of claim 34 wherein said second valve member is of a cross-sectional area sufficiently smaller than that of said passage to provide said passageway.

36. The tool of claim 35 wherein the cross-sectional area of said passage is smaller at the end thereof through which the second valve member enters than is the remainder of the passage.

37. The tool of claim 33 wherein said biasing means includes a piston connected to one of the valve members and having opposite ends exposed respectively to fluid pressure interiorly and exteriorly of said tool, the end exposed to pressure interiorly of the tool being exposed to pressure downstream of the passage when the second valve member is situated therein and to pressure upstream of said passage when the second valve member moves out of said passage.

38. In a fluid actuated impact tool wherein a hammer is mounted for reciprocation between an anvil and a fluid supply conduit and in such reciprocation movable to and from impact engagement with the anvil and wherein power means are provided for moving the hammer in its return stroke away from impact engagement with the anvil, the combination therewith of improved power means for driving the hammer in its power stroke comprising a piston element carried by the hammer and reciprocable in said supply conduit, said piston having a passage through which fluid from the conduit flows to the exterior of the tool, a valve member of a size as to restrict flow through said passage when positioned therein, means mounting the valve member on the conduit for movement into said passage and for limited reciprocation relative to the conduit from a first position to a second position more remote from the hammer than the first, means for biasing the valve member toward its second position, said valve member having sufficient of a fluid pressure actuatable area exposed to fluid pressure upstream of said passage that such pressure overcomes said biasing means when the valve member restricts flow through the passage, said mounting means positioning said valve member when the latter is in its second position so that it begins to restrict flow through said passage when the hammer is at a point in its return stroke thereby increasing pressure of fluid upstream of said passage causing the valve member to dive into said passage to its first position and to be maintained in such position until the hammer has moved through at least a portion of its power stroke.

39. The tool of claim 38 wherein said passage has a sufficiently greater cross-sectional area than that of said valve member to permit a limited amount of fluid to flow therethrough while the valve member is positioned therein.

40. The tool of claim 38 wherein said passage is of smaller cross-sectional area at its inlet end than it is at points downstream thereof.

41. In an impact tool wherein a hammer is reciprocated with respect to a tool element, the combination therewith of an improved telescoping joint between the hammer and tool element comprising a first part having an outer face and telescoping within a second part having an inner face opposing said outer face, one of the parts being carried by the hammer and the other by the tool element, a plurality of longitudinal splineways in and arranged around the outer face of the first part, a plurality of longitudinal splineways in the inner face of said second part with each being radially aligned and paired with one of the splineways in said first part, a plurality of spacer elements in each of the splineway pairs with the total length of the spacer elements being less than that of at least one of said splineways, said inner and outer faces being radially spaced apart and said spacer elements being of a size relative to the depth of said splineways as to maintain said faces in spaced apart relationship whereby said hammer can reciprocate relative to said tool element and yet relative rotation therebetween is prevented.

42. The tool of claim 41 wherein said spacer elements are ball bearings.

43. The tool of claim 41 wherein said spacer elements are roller bearings.

44. The tool of claim 41 wherein said spacer elements are ball and roller bearings arranged alternately with each other in each splineway pair.

References Cited in the file of this patent

UNITED STATES PATENTS

| | | |
|---|---|---|
| 1,167,774 | Mentzer | Jan. 1, 1916 |
| 1,438,097 | Cole | Dec. 5, 1922 |
| 1,861,042 | Zublin | May 31, 1932 |
| 1,892,517 | Pennington | Dec. 27, 1932 |
| 1,926,119 | Smith | Sept. 12, 1933 |
| 2,108,947 | Seifer | Feb. 22, 1938 |
| 2,314,560 | Scharpenberg | Mar. 23, 1943 |
| 2,359,147 | Merten | Sept 26, 1944 |
| 2,584,978 | Bassinger | Feb. 12, 1952 |
| 2,620,162 | Pennington | Dec. 2, 1952 |
| 2,665,115 | Bassinger | Jan. 5, 1954 |
| 2,756,723 | Bassinger | July 31, 1956 |
| 2,764,130 | Bassinger | Sept. 25, 1956 |
| 2,800,884 | Mori | July 30, 1957 |
| 2,859,733 | Bassinger et al. | Nov. 11, 1958 |